United States Patent
Bae et al.

(10) Patent No.: US 10,521,314 B2
(45) Date of Patent: Dec. 31, 2019

(54) CROSS-REFERENCED IRREGULAR FIELD STORAGE IN DATABASES

(71) Applicant: SAP SE, Walldorf (DE)

(72) Inventors: Seyeong Bae, Seoul (KR); Ji Hoon Jang, Seoul (KR); Yong Sik Kwon, Seoul (KR); Hyeong Seog Kim, Seoul (KR)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 15/942,151

(22) Filed: Mar. 30, 2018

(65) Prior Publication Data

US 2019/0303251 A1    Oct. 3, 2019

(51) Int. Cl.

| | |
|---|---|
| *G06F 11/16* | (2006.01) |
| *G06F 11/10* | (2006.01) |
| *G06F 16/28* | (2019.01) |
| *G06F 16/2455* | (2019.01) |
| *G06F 11/32* | (2006.01) |
| *G06F 11/07* | (2006.01) |

(52) U.S. Cl.
CPC ........ *G06F 11/167* (2013.01); *G06F 11/1016* (2013.01); *G06F 16/24562* (2019.01); *G06F 16/284* (2019.01); *G06F 11/0769* (2013.01); *G06F 11/321* (2013.01)

(58) Field of Classification Search
CPC .. G06F 11/167; G06F 11/321; G06F 11/0769; G06F 12/0292; G06F 12/0875; G06F 16/22; G06F 16/24; G06F 16/24562
See application file for complete search history.

(56) References Cited

U.S. PATENT DOCUMENTS

| | | | | |
|---|---|---|---|---|
| 5,010,478 | A | * | 4/1991 | Deran ................. G06F 16/40 |
| 5,283,894 | A | * | 2/1994 | Deran ................. G06F 16/40 |
| | | | | 707/704 |
| 6,081,811 | A | * | 6/2000 | Nilsson ............... G06F 16/258 |
| 9,460,176 | B2 | | 10/2016 | Kwon et al. |
| 9,720,992 | B2 | | 8/2017 | Lee et al. |
| 10,067,969 | B2 | * | 9/2018 | Rice .................... G06F 16/2282 |
| 2014/0280162 | A1 | * | 9/2014 | Halpern ............... G06F 16/24 |
| | | | | 707/737 |
| 2015/0149514 | A1 | | 5/2015 | Kim et al. |
| 2015/0149736 | A1 | | 5/2015 | Kwon et al. |
| 2016/0371315 | A1 | | 12/2016 | Kwon et al. |
| 2017/0075936 | A1 | | 3/2017 | Noh et al. |

\* cited by examiner

*Primary Examiner* — Nadeem Iqbal
(74) *Attorney, Agent, or Firm* — Klarquist Sparkman, LLP

(57) ABSTRACT

Improved database consistency and consistency checking may be provided by cross-referenced split data storage for irregular fields using auxiliary pointers. A fixed-size memory slot may be allocated to a database table in a database system, where the fixed-size memory slot has an address. A variable-size memory slot may be allocated to the database table, where the variable-size memory slot has a different address. For an irregular field in the database table, one or more properties of the irregular field may be stored in the fixed-size memory slot. The one or more properties may include a first pointer which may have the address of the variable-size memory slot. For the irregular field in the database table, at least a portion of data of the irregular field and a second pointer, which may have the address of the fixed-size memory slot, may be stored in the variable-size memory slot.

20 Claims, 16 Drawing Sheets

500 → [43558][400286][86/-1] [date_stamp] [time_stamp] e RS_Memory    VarGroupBase.cc(00163) : Found back pointer mismatch. varGroup: [memory address], ptrInVslot: [memory address], fSlot: [memory address]

510 → [42678][400257][39/7338] [date_stamp] [time_stamp] e RS_Memory    MemorySlot.cc(00075) : Invalid back pointer detected from VarGroup in flushSubslots. vSlot(target of deletion but skipped): [memory address], fSlot(data or version): [memory address], persist_fSlot: [memory address]

520 → [42639][400298][1/0] [date_stamp] [time_stamp] e RS_Version_GC   LinkVersion_collect.cc(01279) : Found invalid back pointer during version garbage collection. LinkVersion: [memory address], kind: 1, Record(physical): [memory address], Record(logical): (2, 47071584), ContainerID: 263

FIG. 5A

CROSS-REFERENCED IRREGULAR FIELD STORAGE IN DATABASES

FIELD

The present disclosure generally relates to improved database storage structures, and methods for enhancing and verifying database consistency in a database management system. Particular implementations relate to specific data storage structures for enhancing data storage consistency and enhanced methods for testing or verifying database consistency within the data storage.

BACKGROUND

Data storage for a database may include storage of fields with fixed lengths or fields of variable lengths. As fields of varying lengths become increasingly common in databases, efficiently storing such fields becomes increasingly important. However, storing varying-length fields can lead to storage inefficiencies or, with more efficient strategies, inconsistencies in the storage of the records and fields of database tables, such as through programming or other error. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A process for generating and testing a structure for improving database consistency is provided. A fixed-size memory slot having a first address may be allocated to a database table in a database system. A record of the database table may be stored in the fixed-size memory slot, where the record has an irregular field. A variable-size memory slot having a second address may be allocated to the database table.

The address of the variable-size memory slot may be stored in the record stored in the fixed-size memory slot. At least a portion of data for the irregular field may be stored in the variable-size memory slot. The address of the fixed-size memory slot may be stored in the variable-size memory slot.

The record in the fixed-size memory slot may be accessed. The first address of the fixed-size memory slot may be identified. The address of the variable-size memory slot may be read from the record in the fixed-size memory slot. The variable-size memory slot may be accessed based on the address as read from the record in the fixed-size memory slot. The fixed-size memory slot address may be read as stored in the accessed variable-size memory slot.

The identified address of the fixed-size memory slot may be compared to the value of the fixed-size memory slot address read from the variable-size memory slot to determine database record consistency. Responsive to a failed equivalency of the identified address of the fixed-size memory slot compared to the value of the fixed-size memory slot address read from the variable-size memory slot, an error message may be written, where the error message includes a record identifier for the record, the identified address of the fixed-size memory slot, and the value of the fixed-size memory slot address read from the variable-size memory slot.

An additional process for generating a structure for maintaining and testing database consistency is provided. A fixed-size memory slot may be allocated to a database table in a database system, where the fixed-size memory slot has an address. A variable-size memory slot may be allocated to the database table, where the variable-size memory slot has a different address.

For an irregular field in the database table, one or more properties of the irregular field may be stored in the fixed-size memory slot. The one or more properties may include a first pointer which may have the address of the variable-size memory slot. For the irregular field in the database table, at least a portion of data of the irregular field and a second pointer, which may have the address of the fixed-size memory slot, may be stored in the variable-size memory slot.

A further process for testing the consistency of a database is provided. A record of a table in a database is identified. A first portion of the record may be stored in a first memory location having a first logical address and a second portion of the record may be stored in a second memory location having a second logical address. Further, the first portion of the record may include a first pointer to the second memory location and the second portion of the record may include a second pointer to the first memory location.

The first logical address of the first portion of the record is determined. The first pointer is traversed to the second portion of the record. The second pointer in the second portion of the record is read. Testing the equivalency of the value as read of the second pointer compared to the determined first logical address of the first record is accomplished.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 5A depicts example inconsistency trace or log messages from testing auxiliary pointers.

DETAILED DESCRIPTION

Figure 1A:
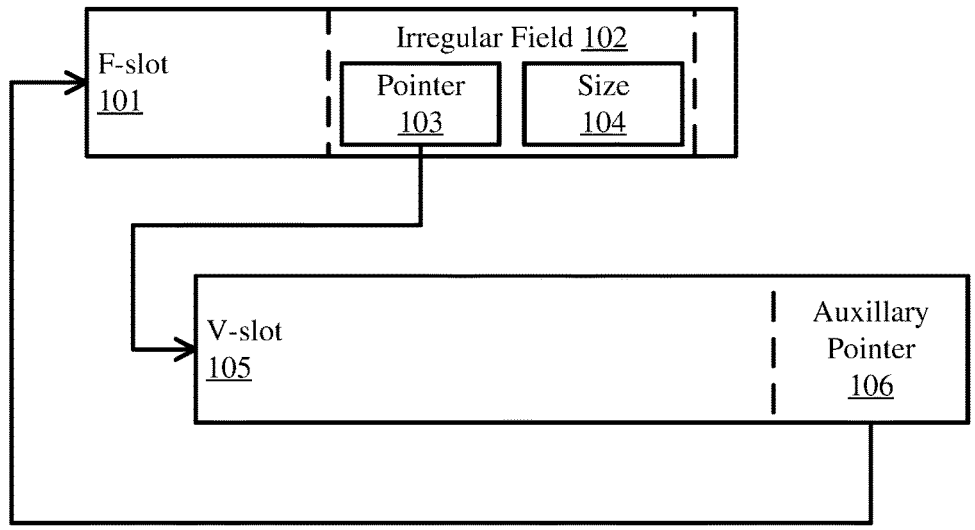
FIG. 1A is a schematic diagram of an architecture for cross-referenced data storage.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Cross-Referenced Irregular Field Storage Overview

A cross-reference data storage pointer for irregular fields in databases may be provided to improve data integrity and consistency in a database system. Tables in a database may include fields (e.g. columns) that do not have a fixed size, but may vary in length; such fields may be thought of as irregular fields because the amount of memory they use varies from record to record (or value to value). Database systems can store such fields split between two memory locations: a memory location that stores the fixed-size fields and a fixed-size version of the irregular field, and a separate memory location that stores the variable-size data of the irregular field. The fixed-size memory location generally includes a pointer to the variable-size location. In at least some cases, the fixed-size memory location can also include all or a portion of the data for the irregular field.

However, pointers can become corrupted and thus point to the wrong physical memory address or, in the case of a logical pointer, the wrong object, or to "garbage," such as an unallocated physical memory address, a non-existent object, the middle of an object, or so on. This corruption may be caused by programming errors or system errors such as flipped bits or other memory corruption events or triggers. Identifying such inconsistencies in a database is important for maintaining data integrity and accessibility, however the functionality typically available for identifying inconsistencies is limited. A second, cross-reference data storage pointer for an irregular field can improve the consistency of a database by improving the ability to detect inconsistencies or bad (or corrupted) pointers, and improving the ability to repair such inconsistencies. A cross-reference data storage pointer may be thought of as a back pointer or an auxiliary pointer for irregular fields.

The auxiliary pointer may act as a second, confirming reference for an irregular field when placed in the variable-size memory location (along with the irregular field data). Thus, for an irregular field that is stored split between two memory locations, the auxiliary pointer adds a second reference to confirm that the two memory locations are, in fact, the correct memory locations for the irregular field. The auxiliary pointer is effective at improving the consistency property of ACID for database systems and transactions.

The auxiliary pointer may be implemented in any database system that splits storage of a field between two memory locations. Such database systems (database management systems) may include in-memory systems or non-volatile storage systems. The auxiliary pointer may be implemented in a row-store, or a column-store, database. One example database system in which the auxiliary pointer may be implemented is SAP HANA™ of SAP SE of Walldorf, Germany.

Use of auxiliary pointers can slightly increase database memory needed to store irregular fields, because of the space needed to store the auxiliary pointer. However, the increased memory use can be relative small, being only the size of a memory location address or logical pointer reference. Generally, the increase in memory usage is offset by the ability to test for pointer consistency in irregular fields, resultant improved database consistency, and the ability to troubleshoot any identified inconsistencies. This can lead to fewer database management problems as more programming errors are discovered and resolved during testing (or production), and can lead to faster resolution of errors or memory leaks by having an additional method to confirm or discover database inconsistencies.

Although described for use in variable fields, the described technologies can be used in other scenarios where data for a record is maintained in different locations (e.g., accessible by physical or logical pointers). For example, the technologies could be used to maintain consistency between multiple fixed-size locations or between multiple variable-sized locations.

Example 2—Cross-Referenced Data Storage Architecture

FIG. 1A is a schematic diagram of an architecture for cross-referenced data storage. A fixed data slot, f-slot 101, may contain one or more fields. The fields may correspond to columns of a database table, and the data stored may correspond to a specific row of the table. The fields may be of fixed or known lengths, or of variable lengths.

The f-slot 101 may have an irregular field 102. An irregular field 102 may be a field whose length varies between different records in the database. In some embodiments, the records may be rows in a table in a row-store database and the irregular field may be a column of the table having a type that allows for varying storage length. An irregular field 102 may be of a variable group type, such as a VARCHAR (e.g., VARCHAR(20), having a maximum length of 20 characters), NVARCHAR, VARBINARY, or ALPHANUM, or it may be of a large object type (LOB), such as a BLOB, CLOB, or NCLOB. Although not shown, the-slot can include one or more regular fields (e.g., int, CHAR) in addition to one or more irregular fields).

Data for the irregular field 102 may be stored split between the f-slot 101 and the v-slot 105. The f-slot 101 may store a set of properties, or attributes, of the irregular field 102, such as a pointer 103 and a size 104. Other attributes may include a hybrid indicator, a temporal indicator, or an auxiliary pointer indicator, for example. The attributes are generally of a fixed size, thus making the size of the irregular field 102 stored in the f-slot 101 fixed and known. That is, the properties can be specified by values having a fixed number of bits, but the actual values can vary, such as depending on the size of particular data for a particular v-slot 105.

The data of the irregular field 102, which may vary in length, may be stored in a variable length slot, v-slot 105. The pointer 103 of the irregular field 102 may contain the address (physical or logical) of the v-slot 105 containing the data of the irregular field. The size attribute 104 may provide the amount of memory the data of the irregular field 102 uses in the v-slot 105. The size 104 may be a memory offset or other value indicating the memory usage of the irregular field 102 in the v-slot 105.

The v-slot 105 may contain, in addition to the data of the irregular field 102, an auxiliary pointer 106. The auxiliary pointer 106 may contain the address (physical or logical) of the f-slot 101, within which the irregular field 102 is stored. The auxiliary pointer 106 may be stored in the v-slot 105 after the data of the irregular field 102, and the size of the auxiliary pointer 106 may be included in the total size 104 of the irregular field 102. However, the auxiliary pointer 106 could be stored in another part of the v-slot 105, such as at the beginning.

Thus, the f-slot 101 references the v-slot 105 for the irregular field 102 through the irregular field pointer 103. The v-slot 105 then is cross-referenced back to the f-slot 101 by the auxiliary pointer 106. In this way, all storage for the irregular field 102 is linked and key addresses are known within the storage itself.

The irregular field pointer 103 and the auxiliary pointer 106 may store the actual memory addresses of their respective v-slot 105 and f-slot 101. In another embodiment, the irregular field pointer 103 and the auxiliary pointer 106 may be logical pointers, storing logical memory addresses. In such an embodiment, the f-slot and v-slot data storage scheme may be decoupled from the underlying physical memory locations, which may allow for greater flexibility in data storage (including persisting the logical pointers to secondary storage) and maintenance and may reduce the risk of table inconsistencies or other memory addressing errors.

Figure 1B:
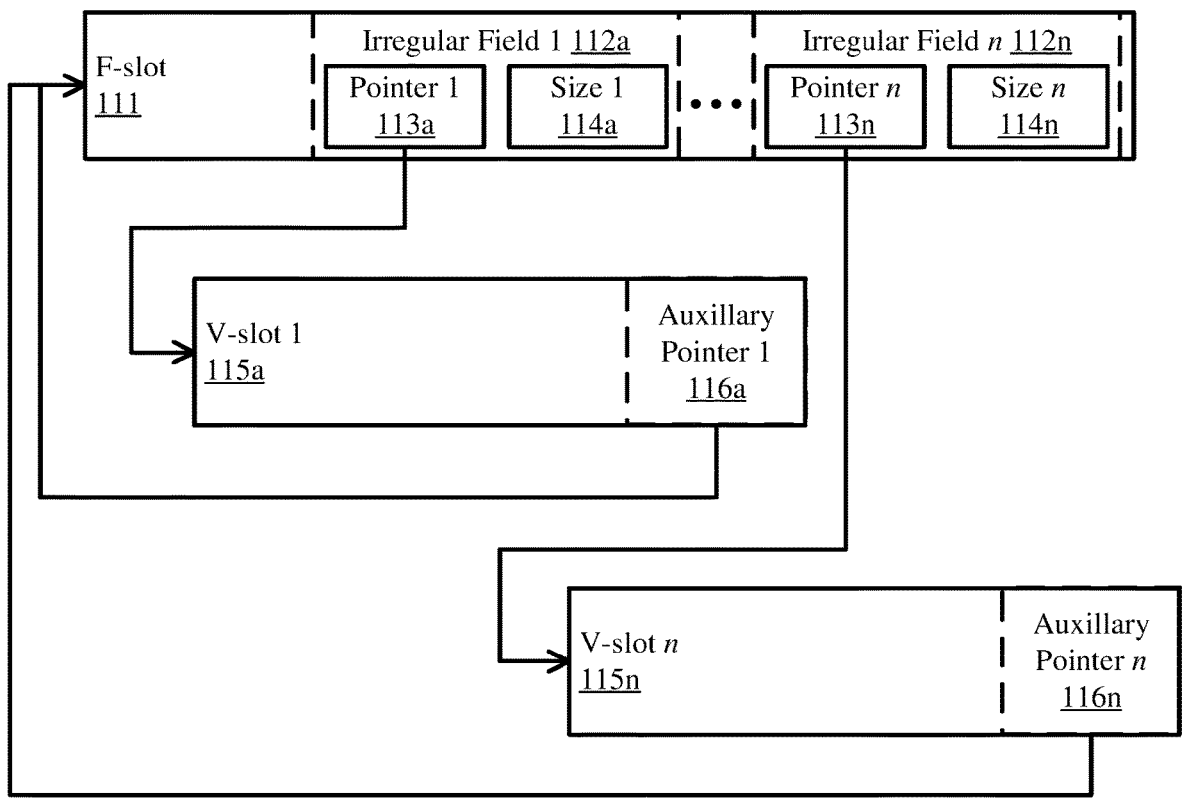
FIG. 1B is a schematic diagram of an architecture for cross-referenced data storage across multiple fields.

FIG. 1B is a schematic diagram of an architecture for cross-referenced data storage across multiple fields, similar to the architecture in FIG. 1A. A fixed data slot, f-slot 111, may have one or more fields, which are generally of fixed sizes, respectively. The f-slot 111 may have one or more irregular fields, such as irregular field 1, 112a, through irregular field n, 112n. The irregular fields 112a-n may have respective properties or attributes, such as pointer 1, 113a, through pointer n, 113n, or size 1, 114a, through size n, 114n. The irregular fields 112a-n may have other attributes as well, as described herein.

Storage of the irregular fields 112a-n may be split between the f-slot 111 and multiple v-slots 115a-n. The attributes of the irregular fields 112a-n, such as pointers 1-n, 113a-n, or sizes 1-n, 114a-n, are generally stored in their respective portions of the f-slot 111. The data of the irregular fields 112a-n are generally stored in v-slots, such as v-slot 1, 115a, through v-slot n, 115n. Further, the separate v-slots may each have an auxiliary pointer, such as auxiliary pointer 1, 116a, through auxiliary pointer n, 116n.

For example, the data for Irregular Field 1, 112a, may be stored in v-slot 1, 115a. Pointer 1, 113a, of Irregular Field 1, 112a, may contain the address of v-slot 1, 115a. Further, v-slot 1, 115a, may contain an auxiliary pointer 1, 116a, which may contain the address of the f-slot 111, where the Irregular Field 1, 112a, is in part stored. Similarly, the data for Irregular Field n, 112n, may be stored in v-slot n, 115n. Pointer n, 113n, of Irregular Field n, 112n, may contain the address of v-slot n, 115n. Further, v-slot n, 115n may contain an auxiliary pointer n, 116n, which may contain the address of the f-slot 111, where the Irregular Field n, 112n, is in part stored. Both auxiliary pointer 1, 116a, and auxiliary pointer n, 116n, point to the same f-slot 111 and so contain the same address while being separate fields in separate v-slots, as their respective irregular fields 112a-n are located in the same f-slot.

Although the v-slot 105 and the v-slots 115a-115 are shown as containing data for a singular irregular field 102, 112a-112n, in other cases a v-slot can store data for multiple irregular fields. In such case, a first v-slot can store data until a v-slot capacity would be exceeded. At the point, an additional v-slot can be allocated, such as in the manner shown in FIG. 1B.

Example 3—Cross-Referenced Expanded Data Storage Architecture

Figure 2A:
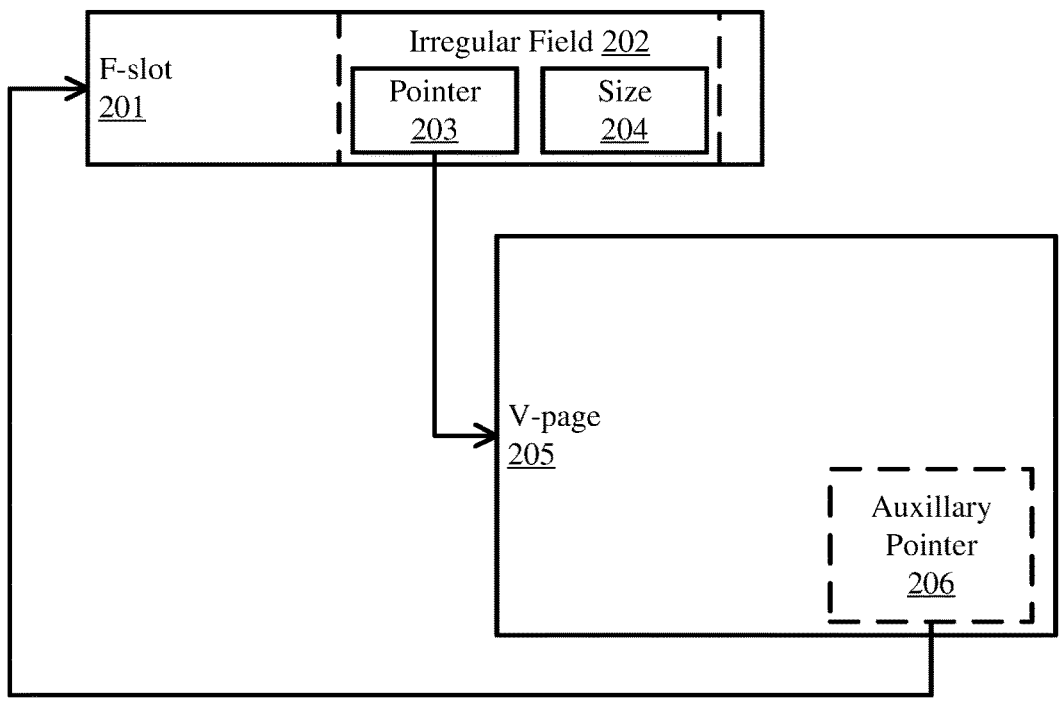
FIG. 2A is a schematic diagram of an architecture for cross-referenced data storage across a data page.

FIG. 2A is a schematic diagram of an architecture for cross-referenced data storage across a data page. In some cases, a v-slot may not provide enough storage space for the data of an irregular field, so a v-page may be used in such cases. Generally, a v-page will have more storage space, or memory allocated to it, than a v-slot. In at least some cases, a v-page can be a unit of data storage of a particular type. For example, a page can be a minimum addressable unit in an input/output (e.g., disk access) operation.

An f-slot 201 may store an irregular field 202, in part, as described herein. The properties or attributes of the irregular field 202, such as a pointer 203 and a size 204, may be stored in the f-slot 201. The irregular field 202 may contain more data than can be stored in a v-slot, and so a v-page 205 may be used to store the data of the irregular field 202. This may be most commonly used for irregular fields of LOB types, such as BLOBs, CLOBs, or NCLOBs.

The irregular field pointer 203 may contain the address of the v-page 205. The v-page may store the data of the irregular field 202. The v-page 205 may contain an auxiliary pointer 206, similar to as described herein for a v-slot. The auxiliary pointer 206 generally contains the address of the f-slot 201.

In this way, the cross-referenced data storage structure is not limited to a single type of variable storage location, such as a v-slot, but may instead utilize a v-page, or any other type or size of variable-size data storage location.

Figure 2B:
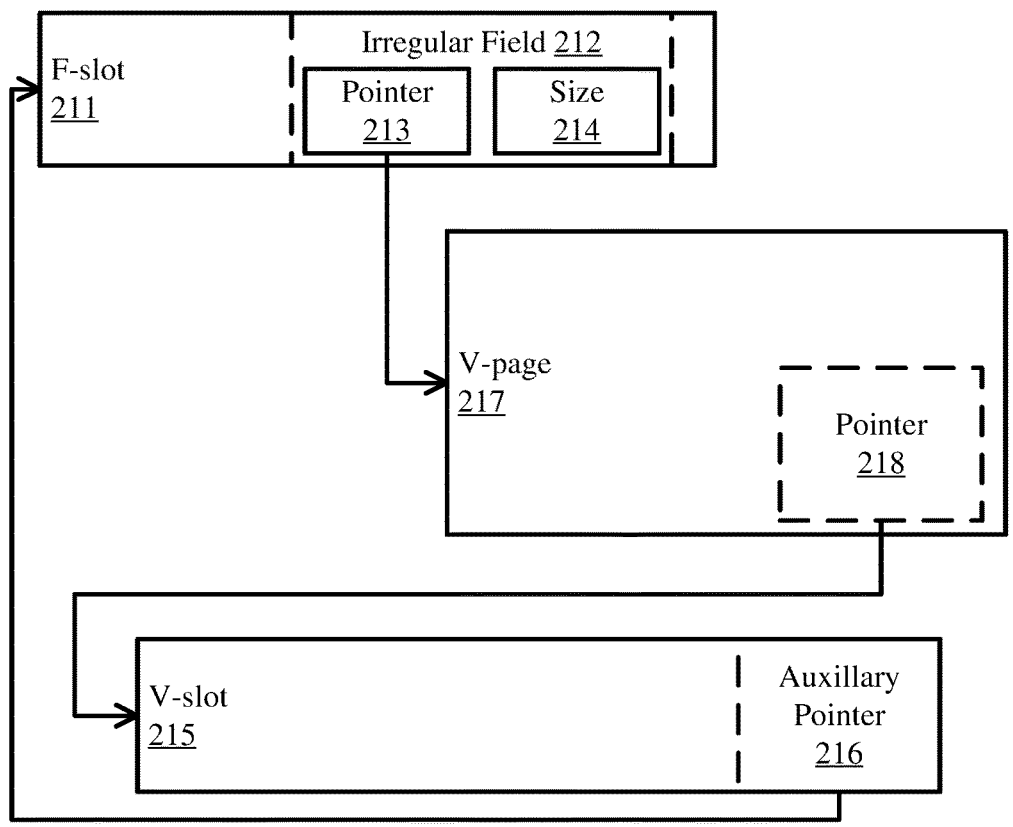
FIG. 2B is a schematic diagram of an architecture for cross-referenced data storage across a data page and data slot.

FIG. 2B is a schematic diagram of an architecture for cross-referenced data storage across a data page and a data slot. In some cases, neither a single v-slot nor a single v-page is sufficient to store the data of an irregular field. In such cases, a v-page and a v-slot may be used together to store the data of an irregular field, as described herein.

An f-slot 211 may store an irregular field 212, in part, as described herein. The attributes of the irregular field 212, such as a pointer 213 and a size 214, may be stored in the f-slot 211. The irregular field 212 may contain more data than can be stored in a v-slot or a v-page, and so a combination of a v-page 217 and a v-slot 215 may be used to store the data of the irregular field 212. This may be most commonly used for irregular fields of LOB types, such as BLOBs, CLOBs, or NCLOBs.

The irregular field pointer 213 may contain the address of the v-page 217. The v-page 217 may store some portion of the data of the irregular field 212. The v-page 217 may then contain a pointer 218 to the v-slot 215, which contains the address of the v-slot.

The v-slot 215 may store the remaining portion of the data of the irregular field 212. The v-slot 205 may contain an auxiliary pointer 216, similar to as described herein with respect to FIG. 1A and FIG. 1B. The auxiliary pointer 216 generally contains the address of the f-slot 211.

In this way, the cross-referenced data storage structure is not limited to a single variable storage location, such as a single v-slot or a single v-page, but may instead utilize a v-slot and a v-page in combination, or any other type or size of variable-size data storage location in combination.

Figure 2C:
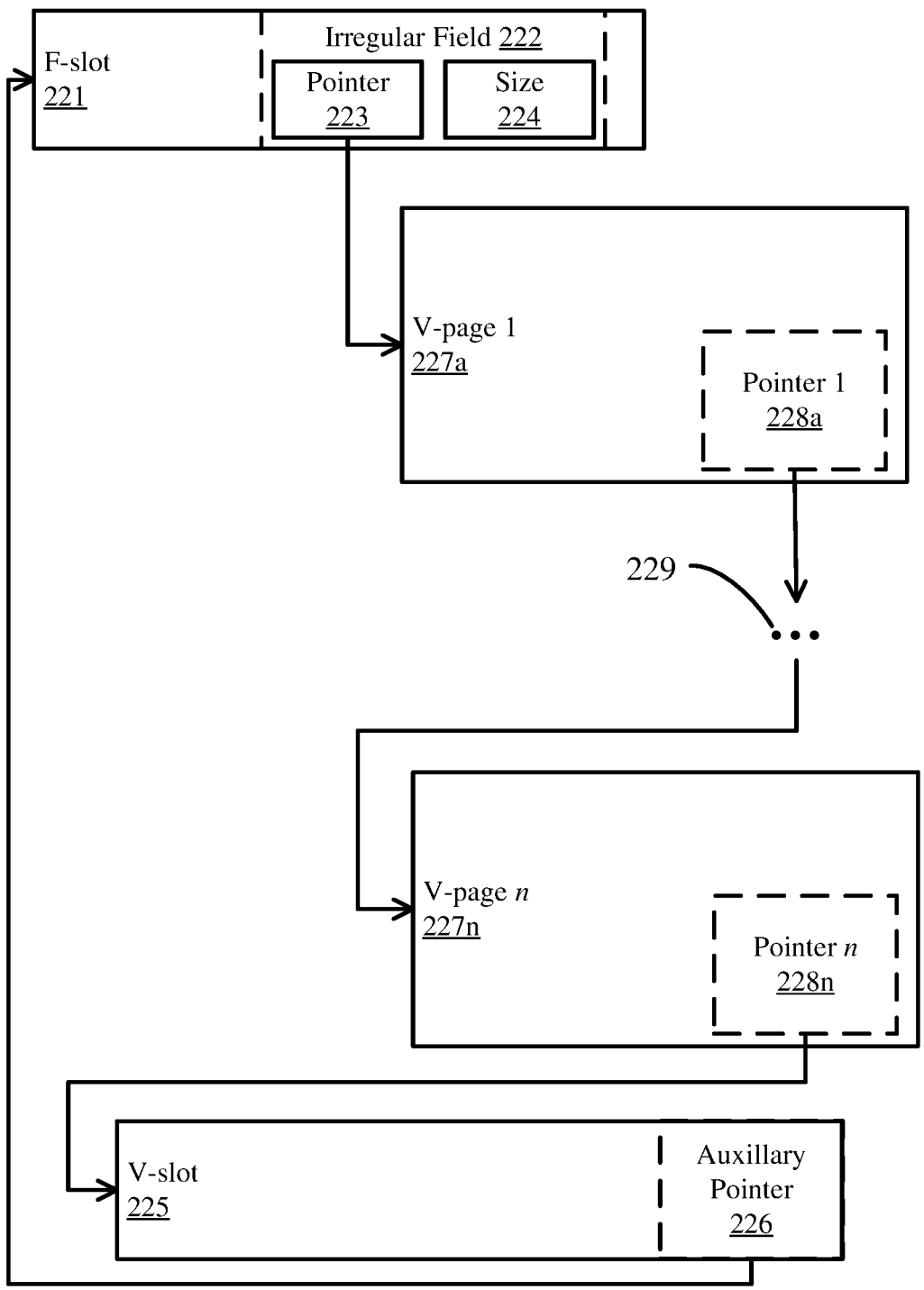
FIG. 2C is a schematic diagram of an architecture for cross-referenced data storage across multiple data pages and a data slot.

FIG. 2C is a schematic diagram of an architecture for cross-referenced data storage across multiple data pages and a data slot. In some cases, a v-page and v-slot combination is insufficient to store the data of an irregular field. In such cases, multiple v-pages and a v-slot may be used together to store the data of an irregular field, as described herein. However, in other cases, multiple v-pages could be used, without a v-page, or multiple v-slots could be used, with or without the use of one or more v-pages.

An f-slot 221 may store an irregular field 222, in part, as described herein. The attributes of the irregular field 222, such as a pointer 223 and a size 224, may be stored in the f-slot 221. The irregular field 222 may contain more data than can be stored in a v-slot or a v-page, or a combination thereof, and so a combination of multiple v-pages 227a-n and a v-slot 225 may be used to store the data of the irregular field 222. This may be most commonly used for irregular fields of LOB types, such as BLOBs, CLOBs, or NCLOBs.

The irregular field pointer 223 may contain the address of the first v-page 227a. V-page 1, 227a, may store some portion of the data of the irregular field 222. V-page 1, 227a, may then contain a pointer 228a to the next v-page, which contains the address of the next v-page 229. The next v-page may be v-page n, 227n, or another v-page 229 between v-page 1, 227a, and v-page n, 227n.

There may be any number of v-pages 229, linked by pointers, as shown between v-page 1, 227a, and v-page n 227n. The v-pages 227a-n each contain a pointer 228a-n containing the address of the next v-page. The data of the irregular field 222 is stored in the v-pages 227a-n in corresponding sequential order, such that concatenating the data from each v-page 227a-n in the order of the v-pages, by appending the data from each subsequent v-page to the data from the previous v-page, correctly reconstructs the entire data of the irregular field 222. The final v-page, v-page n, 227n, may contain a pointer n, 228n, to a v-slot 225, which contains the address of the v-slot. Alternatively, the pointer n, 228n, may be an auxiliary pointer and contain the address of the f-slot 221 (e.g., when the v-slot 225 is not used). Or, in some cases, when multiple v-slots or v-pages are used, each slot or page can include the auxiliary pointer for the corresponding f-slot, and optionally pointers for any preceding v-slot or v-page.

The v-slot 225 may store the remaining portion of the data of the irregular field 222 that was not stored in the multiple v-pages 227a-n. The v-slot 225 may contain an auxiliary pointer 226, similar to as described herein. The auxiliary pointer 226 generally contains the address of the f-slot 221.

In this way, the cross-referenced data storage structure is not limited to a single variable storage location, such as a single v-slot or a single v-page, but may instead utilize a v-slot and multiple v-pages in combination, or any other type or size of variable-size data storage location in combination. Thus, very large data objects may still be stored, and the storage structure may still be cross-referenced within itself.

Example 4—Cross-Referencing Across Multiple Versions of Stored Data

Figure 3:
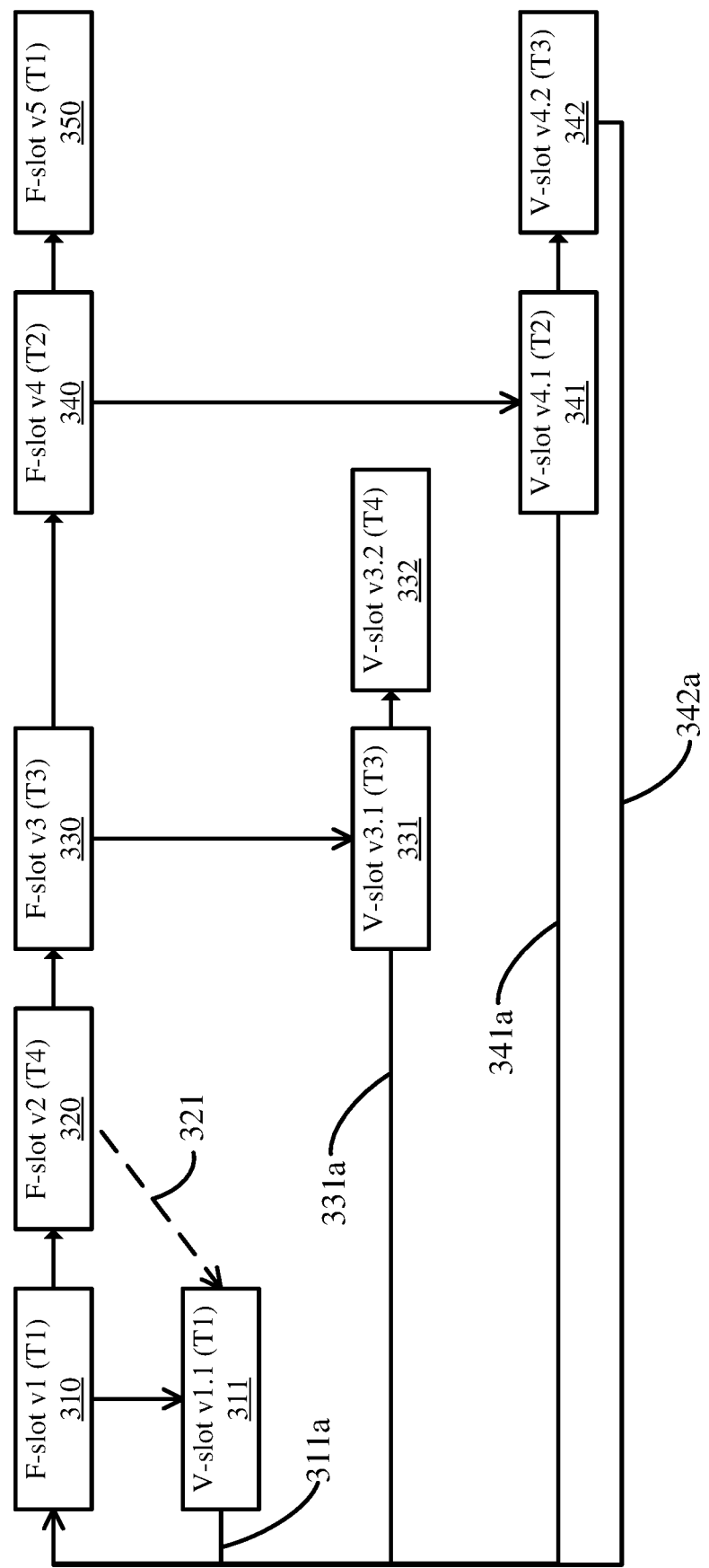
FIG. 3 is a diagram illustrating cross-referenced data storage across multiple versions of a data slot.

FIG. 3 is a diagram illustrating cross-referenced data storage across multiple versions of a data slot (e.g., a f-slot or a v-slot, but versioning can also be used with pages, such as v-pages). Multiple systems or users may access and change a record in a database simultaneously or close in time. The database management system may maintain separate versions of the record due to such multiple access. The record may be stored in an f-slot (or multiple f-slots), as described herein. Thus, an f-slot may have multiple versions representing different changes or accesses by one or more users or systems.

An f-slot v1, 310, may have an irregular field which points to a v-slot slot v1.1, 311. The v-slot v1.1, 311, may have an auxiliary pointer which points 311a to f-slot v1, 310.

F-slot v1, 310, may have additional versions, such as f-slot v2, 320, f-slot v3, 330, f-slot v4, 340, or f-slot v5, 350. The separate versions may be related to each other through pointers (physical or logical), indexes, table references, or other means as managed by the database management system. The separate versions 310, 320, 330, 340, 350 may generally represent separate versions of the same record in the database, which is stored in the f-slot.

Each version 310, 320, 330, 340, 350 may be in a different state of use by the database. For example, f-slot v1, 310, may be a primary version, while the other versions 320, 330, 340, 350 may be considered to be temporary versions. F-slot v3, 330, and f-slot v4, 340, may be update versions of f-slot v1, 310; such versions may be in current use by a user or system, or may be waiting to be used to update the primary version 310, or may be waiting to be merged with the primary version (and/or other versions). F-slot v2, 320, may be an old version ready for deletion. F-slot 5, 350, may be a new version just created or inserted.

Versions may also be used for purposes of snapshot isolation, so that a query sees appropriate and consistent records based on when the query started. For example, at least in some implementations, a query should not see records that were added or changed after the query started. When no query can read a data version for a particular database system state, corresponding record versions can be garbage collected (i.e., deleted). In various implementations, record versions can be associated with a commit timestamp or other timestamp that reflects a particular database system state.

Additional versions of an f-slot may also have their own version or versions of a v-slot. For example, f-slot v3, 330, may point to v-slot v3.1, 331. In such a scenario, v-slot v3.1, 331, may have an auxiliary pointer which points 331a to f-slot v1, 310, as described herein. Such an arrangement helps ensure that the v-slot v3.1, 331, functions correctly if used (e.g. overwrites, merges with) v-slot v1.1, 311. Further, this arrangement reinforces that the primary version is f-slot v1, 310, hence the auxiliary pointer in v-slot v3.1, 331, points to f-slot v1, 310.

Further, f-slot v4, 340, may also have a corresponding v-slot v4.1, 341. Similarly, v-slot, v4.1, may have an auxiliary pointer which points 341a to f-slot v1, 310. In this way, all versions of v-slots 311, 331, 341 may point to the primary f-slot, f-slot v1, 310.

V-slots from versions of f-slots may have their own version or versions similar to f-slots. For example, v-slot 3.1, 331, may have an additional version v-slot v3.2, 332. V-slot v4.1, 341, may have an additional version v-slot v4.2, 342. Such a version 332, 342 may be considered to be a temporary version, similar to the temporary f-slot versions 320, 330, 340, 350. Thus, v-slot v3.2, 332, may not have an auxiliary pointer, similar to f-slot v2, 320, not having a v-slot, as it may be waiting for deletion. Alternatively, v-slot v4.2, 342, may have an auxiliary pointer which points 342*a* to f-slot v1, 310, similar to the other auxiliary pointers pointing 311*a*, 331*a*, 341*a* to the primary f-slot 310. By having all auxiliary pointers point 311*a*, 331*a*, 341*a*, 342*a* point to the primary f-slot v1, 310, the records remain consistent and can be efficiently inserted, merged, or removed without the risks associated with more segregated version management, such as mismatched pointers or routinely or continuously resetting pointers as the varying versions are managed or manipulated (which may increase the chance of misaligning a pointer and may increase the processing overhead).

Having auxiliary pointers point to the primary f-slot v, 310, may also simplify or limit the logic necessary to maintain many auxiliary pointers for a single f-slot having multiple versions. Further, depending on the version structure, pointing the various v-slot versions to the primary f-slot version may make traversal of the version structure easier or simpler, and may avoid segregating the structure in a way that limits or prohibits traversal over at least part of the structure. For example, a v-slot can point to an identifier for an f-slot, and then a version chain of f-slot records can be traversed until a desired record version is reached. Having the same f-slot identifier stored in a v-slot version helps ensure that the appropriate f-slot, and version thereof, can be located regardless of which v-slot versions may be deleted as part of a garbage collection process.

In some embodiments, more than one f-slot version may point to a single v-slot version. For example, f-slot v2, 320, may point 321 to v-slot v1.1, 311, which is the same v-slot as pointed to by f-slot v1, 310. In such a scenario, v-slot v1.1, 311, still points 311*a* to the primary f-slot v1, 310. In some aspects, each version of an f-slot record, other than a delete record, can include a separate v-slot. When a new f-slot record version is created, the v-slot of the prior version can be marked for deletion. One or both of f-slot versions and v-slot versions can be identified using a version identifier, such as a commit timestamp or other timestamp, so that appropriate versions can be identified, and optionally corresponding f-slot and v-slot versions identified.

Example 5—Auxiliary Pointers Basic Logic

Generally, an auxiliary pointer may be integrated into standard DML functions, or for specialized DML or other functions of a database system. For example, INSERT or UPDATE functions may include functionality to define and set the auxiliary pointer during the INSERT or UPDATE. This may be done for applicable fields, such as the irregular fields as described herein. More specifically, the logic to create or set an auxiliary pointer may be included in a slot creation or slot define function. In this way, when a new record is created, or a record is updated, that includes an irregular field, the auxiliary pointer may be created and set, to the corresponding f-slot address, as part of defining or allocating the v-slot for storage of the data of the irregular field.

Further, in some embodiments, an auxiliary pointer may be integrated or available in query functionality of a database system. For example, a database system may receive a query, process the query, and return the results. An auxiliary pointer may be referenced (e.g. requested) in the query, or it may be used indirectly, such as to process, calculate, or select a result requested in the query. The results may include the auxiliary pointer(s). Such queries may be user-initiated, part of stored procedures, or may be automated or semi-automated queries or functions that are part of or built into the database system. In further aspects, an auxiliary pointer is not directly used in a query, but query requests are received, and results returned (such as to a user) using database records that include an auxiliary pointer, where the auxiliary pointer can improve database consistency and accuracy.

Example 6—Testing Consistency for a Field Using Auxiliary Pointers

Figure 4A:
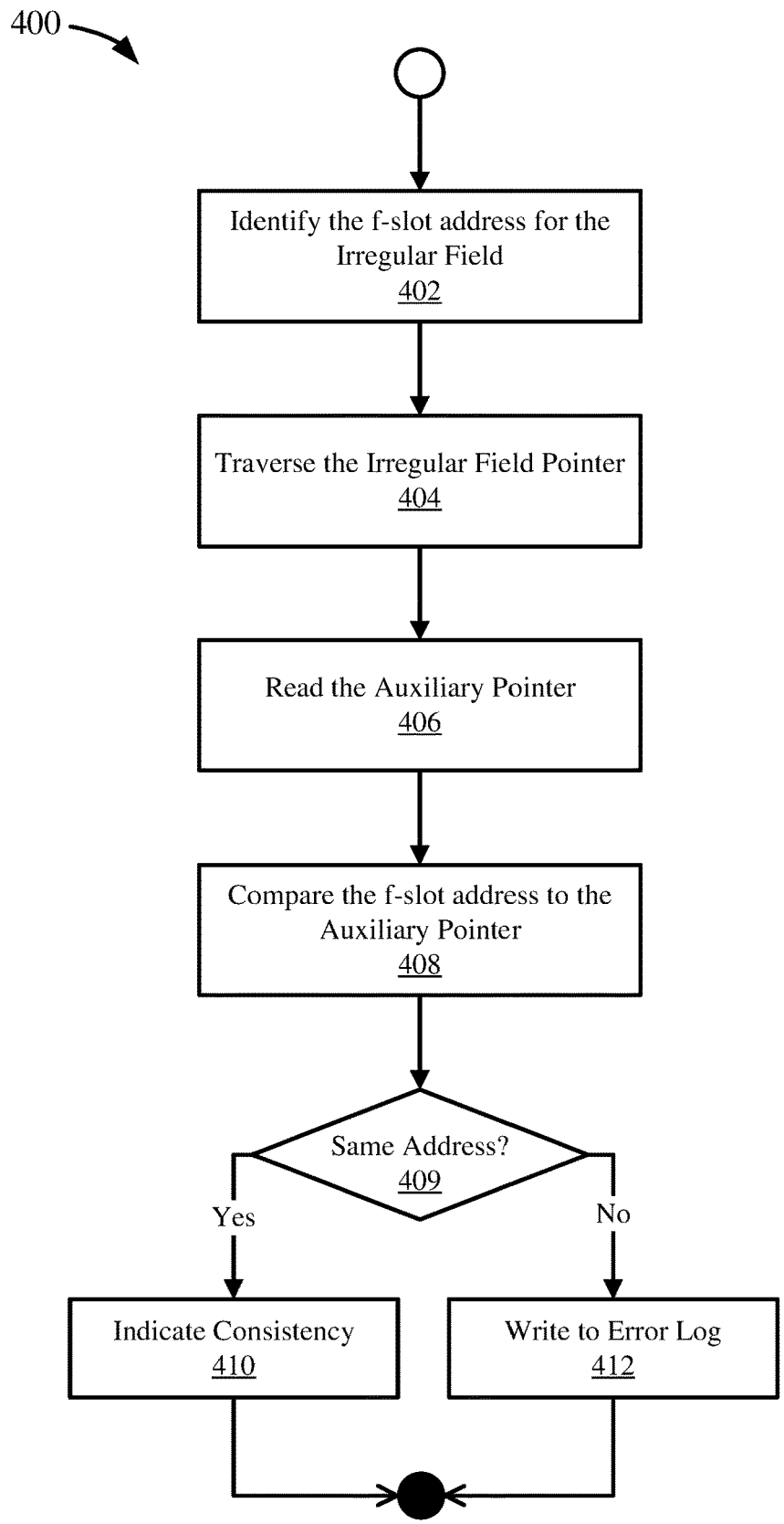
FIG. 4A is a flowchart illustrating a process for testing data storage consistency of a field.

FIG. 4A is a flowchart illustrating a process 400 for testing data storage consistency of an irregular field. Although the irregular field is described with a v-slot, the process 400 can be carried out in an analogous manner for v-pages, or a combination of v-slots and v-pages.

The address for the f-slot in which the irregular field is stored may be identified at 402. This may be accomplished by first determining which f-slot holds the irregular field, and then reading the address of that f-slot, such as from the memory management or database management system, or other memory allocation scheme. The address may be a logical or a physical memory address, as described herein. Further, the address may be stored in a variable, such as a local variable, or local memory for use during the process 400.

The irregular field pointer in the irregular field may be traversed, or followed, at 404. Traversing the irregular field pointer may include reading the address from the irregular field pointer stored in the irregular field in the f-slot, and then accessing the address read. Generally, this may be the address of the v-slot storing the irregular field data and an auxiliary pointer.

The auxiliary pointer may be read from the v-slot, accessed by traversing the irregular field pointer, at 406. Further, this address contained in the auxiliary pointer may be stored in a variable, such as a local variable, or local memory for use during the process 400.

The f-slot address previously determined for the irregular field and the address contained in the auxiliary pointer may be compared at 408. Comparing the addresses at 408 may include testing the addresses for equivalency. The addresses may be tested or compared either directly, such as to determine value equivalence, or indirectly, which may determine that they both reference the same location even if they contain different literal values (such as by accounting for offsets, or logical address equivalence where different logical names reference the same address).

At 409, the process 400 splits depending on if the addresses are the same or not. If the addresses are the same ("yes" at 409), then data storage is consistent and the consistency is indicated at 410. Such consistency generally indicates that the auxiliary pointer in the v-slot points to the correct, corresponding f-slot. The consistency may be indicated by setting a flag variable to indicate consistency, by writing to a process log indicating consistency, or by taking other process steps based on the consistency, such as by proceeding to perform operations on the record or f-slot or v-slot. Or, no action make be taken so long as consistency is determined at 409.

If the addresses are not the same ("no" at 409), then data storage is not consistent and the inconsistency is indicated at 412. Generally, indicating inconsistency may include writing to an error log or providing an error trace. The inconsistency may be indicated by setting a flag variable (or other variable) to indicate inconsistency. Other actions, such as performing operations on the record or f-slot or v-slot, may be skipped or avoided based on the inconsistency. In other embodiments, such actions may be taken regardless of the inconsistency, with only an error log, or error trace, or set variable, indicating the inconsistency. In some embodiments, the process may crash (such as a structured or controlled crash) after an inconsistency is detected; such an embodiment may be used in a testing or development system, for example.

In some embodiments, alerts may be provided to a user when an inconsistency is detected, such as providing a notice (which may contain the error message or error log) to a database administrator when an automatic consistency test reveals an inconsistency. The notice may be provided by email, a screen pop-up message, or other alert.

Example 7—Testing Consistency Across an F-Slot Using Auxiliary Pointers

Figure 4B:
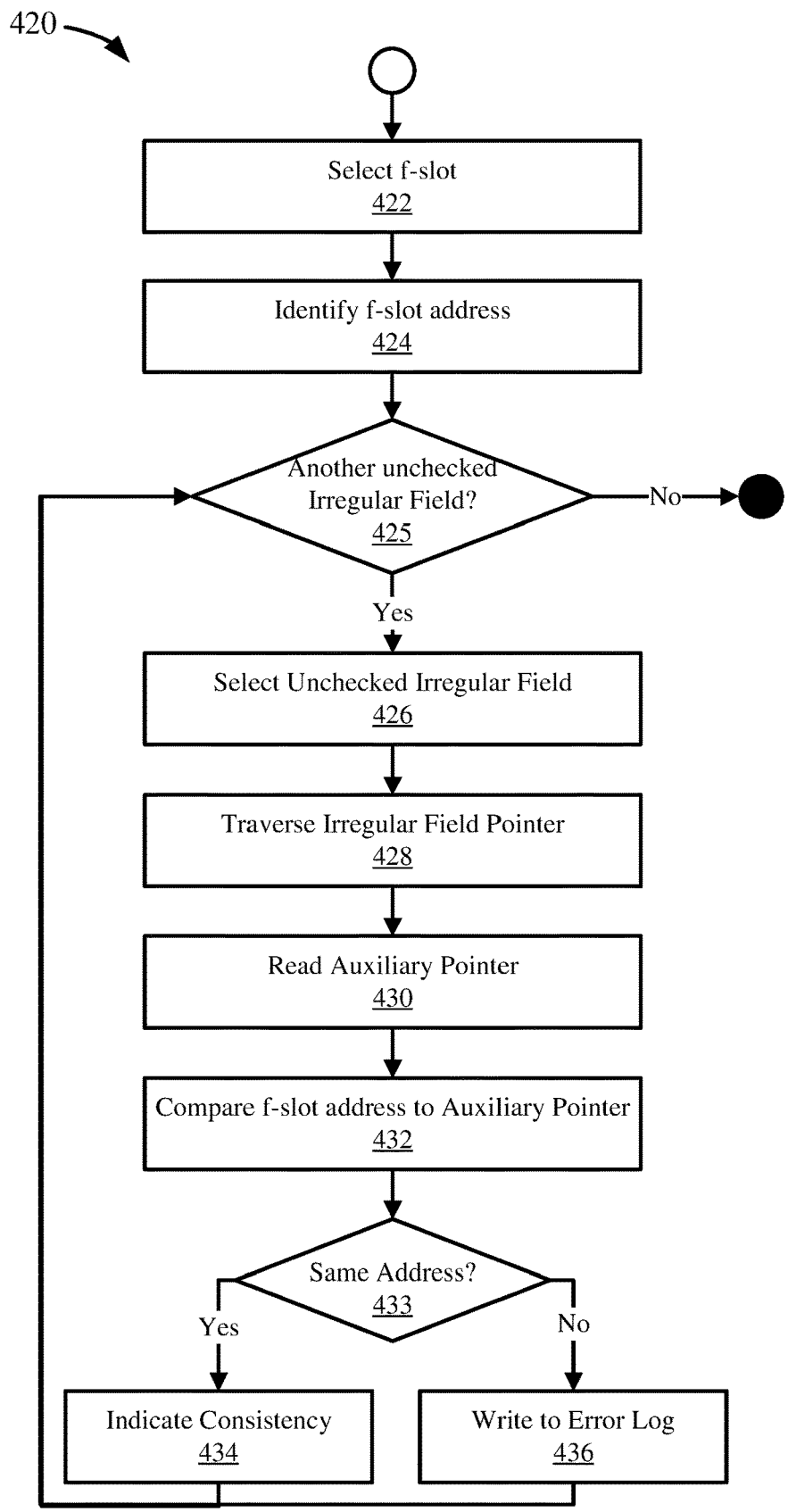
FIG. 4B is a flowchart illustrating a process for testing data storage consistency for a data slot.

FIG. 4B is a flowchart illustrating a process 420 for testing data storage consistency for a data slot storing irregular fields. Although the process 420 is described with respect to a v-slot, an analogous process can be carried out for v-pages, or for a combination of v-slots and v-pages. An f-slot is selected for consistency testing is selected at 422.

The address for the f-slot selected may be identified at 424. This may be accomplished by reading the address of that f-slot, such as from the memory management or database management system, or other memory allocation scheme. The address may be a logical or a physical memory address, as described herein. Further, the address may be stored in a variable, such as a local variable, or local memory for use during the process 420.

At 425, the process 420 determines if there are any remaining, unchecked irregular fields stored in the selected f-slot. If there are no remaining unchecked irregular fields in the selected f-slot ("no" at 425), then the process 420 ends. This may occur after one or more irregular fields in the f-slot have been checked, or on the first pass of the process 420 if there are no irregular fields in the f-slot. Alternatively, the process may not be initiated for an f-slot that does not have at least one irregular field.

If there are one or more unchecked irregular fields in the f-slot ("yes" at 425), then the next unchecked irregular field is selected at 426. Selecting the next irregular field may include accessing the irregular field in the f-slot. The next irregular field may be the next irregular field in the storage order of the f-slot, or it may be any irregular field in the f-slot not yet tested for consistency.

The irregular field pointer in the selected irregular field may be traversed at 428. Traversing the irregular field pointer may include reading the address from the irregular field pointer stored in the selected irregular field in the f-slot, and then accessing the address read. Generally, this may be the address of the v-slot storing the irregular field data and an auxiliary pointer.

The auxiliary pointer may be read from the v-slot, accessed by traversing the irregular field pointer, at 430. Further, this address contained in the auxiliary pointer may be stored in a variable, such as a local variable, or local memory for use during the process 420.

The f-slot address previously determined at 424 and the address contained in the auxiliary pointer and determined at 430 may be compared at 432. Comparing the addresses at 432 may include testing the addresses for equivalency. The addresses may be tested or compared either directly, such as to determine value equivalence, or indirectly, which may determine that both addresses reference the same location even if they contain different literal values (such as by accounting for offsets, or logical address equivalence where different logical names reference the same address).

At 433, the process 420 splits depending on if the addresses are the same or not. If the addresses are the same ("yes" at 433), then data storage is consistent and the consistency is indicated at 434. Such consistency generally indicates that the auxiliary pointer in the v-slot points to the correct, corresponding f-slot. The consistency may be indicated by setting a flag (or other variable) to indicate consistency, by writing to a process log indicating consistency, or by taking other process steps based on the consistency, such as by proceeding to perform operations on the record or f-slot or v-slot. Or, in some aspects, no action is taken if consistency is determined at 433.

If the addresses are not the same ("no" at 433), then data storage is not consistent and the inconsistency is indicated at 436. Generally, indicating inconsistency may include writing to an error log or providing an error trace. The inconsistency may be indicated by setting a flag variable (or other variable) to indicate inconsistency. Other actions, such as performing operations on the record or f-slot or v-slot, may be skipped or avoided based on the inconsistency. In other embodiments, such actions may be taken regardless of the inconsistency, with only an error log, or error trace, or set variable, indicating the inconsistency. In some embodiments, the process may end or crash (such as a structured or controlled crash) after an inconsistency is detected; such an embodiment may be used in a testing or development system, for example.

After indicating consistency at 434 or writing to the error log at 436, the process 420 returns to 425 to determine if there are any remaining, unchecked irregular fields stored in the selected f-slot. This is continued until all irregular fields in the f-slot are tested for consistency (or all auxiliary pointers for the irregular fields in the f-slot are confirmed to point to the f-slot).

Example 8—Auxiliary Pointers in Version Garbage Collection

A database management system may run garbage collection processes (e.g., removal of old data or metadata), which may include version garbage collection. Such garbage collection may be performed as part of standard database management and may run as background processes or be integrated with other database management functions, which may be automatic, in addition to being directed or initiated by a system administrator.

Such garbage collection may include testing database, table, or f-slot consistency as part of the determining which stored data to remove, or which versions to remove in the case of version garbage collection. Process 400 in FIG. 4A or process 420 in FIG. 4B may be used as part of garbage collection or version garbage collection. Such processes may be integrated into garbage collection, or may be invoked by the garbage collection process(es).

For example, an irregular field may be tested as part of confirming consistency before performing an action, such as deletion, on a record during garbage collection. This may be carried out for each irregular field that is part of the garbage collection. Alternatively, an entire f-slot may be tested for consistency before performing an action on the f-slot as part of garbage collection; this may also be done for a v-slot. During version garbage collection, a version of an f-slot or a v-slot, the entire version may be tested for consistency before performing an action, such as deletion of the version. This may be performed for each f-slot or v-slot involved in the garbage collection, or each version involved in the version garbage collection. In one embodiment, f-slot versions may be tested and collected before v-slot versions.

By testing consistency between an f-slot and corresponding v-slot before garbage collection or version garbage collection, the maintenance process can avoid potential errors in removal. For example, if the auxiliary pointer in a v-slot does not point to the f-slot that referenced the v-slot, then it is possible the v-slot is also being used by a different f-slot (to which it may point). In such a scenario, the v-slot may be kept and not removed as part of garbage collection; an inconsistency message may still be provided, such as in an error trace or other log file, for a system administrator to review. In this way, detection of misaligned auxiliary pointers may help prevent removal of v-slots or f-slots that may appear ready for removal but are not. This may include other actions beyond removal as well, such as merging versions or other maintenance on versioning.

Example 9—Auxiliary Pointers in Table Consistency Checks

A database management system may run table consistency checks. Such table consistency checks may be carried out as part of standard database management and may run as background processes or be integrated with other database management functions, in addition to being directed or initiated by a system administrator. Generally, table consistency checks are initiated by a system administrator or other authorized user.

Such table consistency checks may include testing the f-slots and v-slots (or v-pages) in which the data of the database table is stored. Process 400 in FIG. 4A or process 420 in FIG. 4B may be used as part of a table consistency check. Such processes may be integrated into the table consistency check, or may be invoked by the table consistency check process(es).

For example, an irregular field may be tested as part of confirming table consistency. This may be performed for each irregular field that is part of the table being tested. Alternatively, an entire f-slot may be tested for consistency as part of the table consistency check. Generally, during a table consistency check, all f-slots storing data for the table, and all corresponding v-slots, are checked for consistency. In one embodiment, f-slot versions may be tested and collected before v-slot versions.

Generally, a table consistency check is a function that can be run by a system administrator, or other authorized user. The table consistency check generally will provide an error trace during the check, or an error log for use after the check completes, as described herein. Such checks may assist in troubleshooting or diagnosing database errors, inefficiencies, or validating or verifying functionality.

Additionally, table consistency checks may be run automatically during a database savepoint. A database management system may regularly, either through scheduling or triggering events, save or archive the data in the database. At such times, a table consistency check or other consistency check may be performed, which may utilize the testing the auxiliary field as described herein.

Example 10—Inconsistency Detected Messages

FIG. 5A depicts example 500, 510, 520 inconsistency messages (error messages). An error message 500, 510, 520 may be provided as part of an error trace, memory trace, error log, process log, or any other system tracking process or data. Generally, such inconsistency messages 500, 510, 520 may be generated as part of the process 400 shown in FIG. 4A, such as at step 412, or the process 420 shown in FIG. 4B, such as at step 436.

Generally, an inconsistency message 500, 510, 520 may provide an identifier for the testing run, a date and/or time of the test, an indicator of the process that generated the message, or the type of test run. Further, such a message 500, 510, 520 may include a statement of the error uncovered; for example here, a statement that an invalid or inconsistent auxiliary pointer was found.

Such a message 500, 510, 520 may further provide detailed information about the inconsistency in the auxiliary pointer, such as the address of the f-slot or the address found in the auxiliary pointer, or both. Other memory information may be included as well, such as both the logical address and the physical address, or other memory information such as the page or container in which the f-slot or the v-slot are found. In some cases, if multiple f-slots reference a single v-slot, a report can be provided that lists such f-slots, such that a user, for example, can determine the appropriate dependency, as, in at least particular example, a v-slot is associated with a single f-slot (although a single f-slot may be associated with multiple v-slots, v-pages, or a combination thereof).

The inconsistency message may vary depending on the process that generates the message. For example, inconsistency message 500 is an example general message that may be broadly used. Inconsistency message 500 may be used for process 400 in FIG. 4A or process 420 in FIG. 4B. Inconsistency message 500 may also be used during testing of a newly created v-slot, for example, or in table consistency checks.

Other inconsistency messages may be used for more specific processes. For example, inconsistency message 510 may be used during versioning of a record, when a version of a v-slot may be set for update or deletion. As another example, inconsistency message 520 may be used during version garbage collection. Similar such messages may be used for other database management processes that include testing database or table consistency.

Example 11—Consistency Testing Results

Figure 5B:
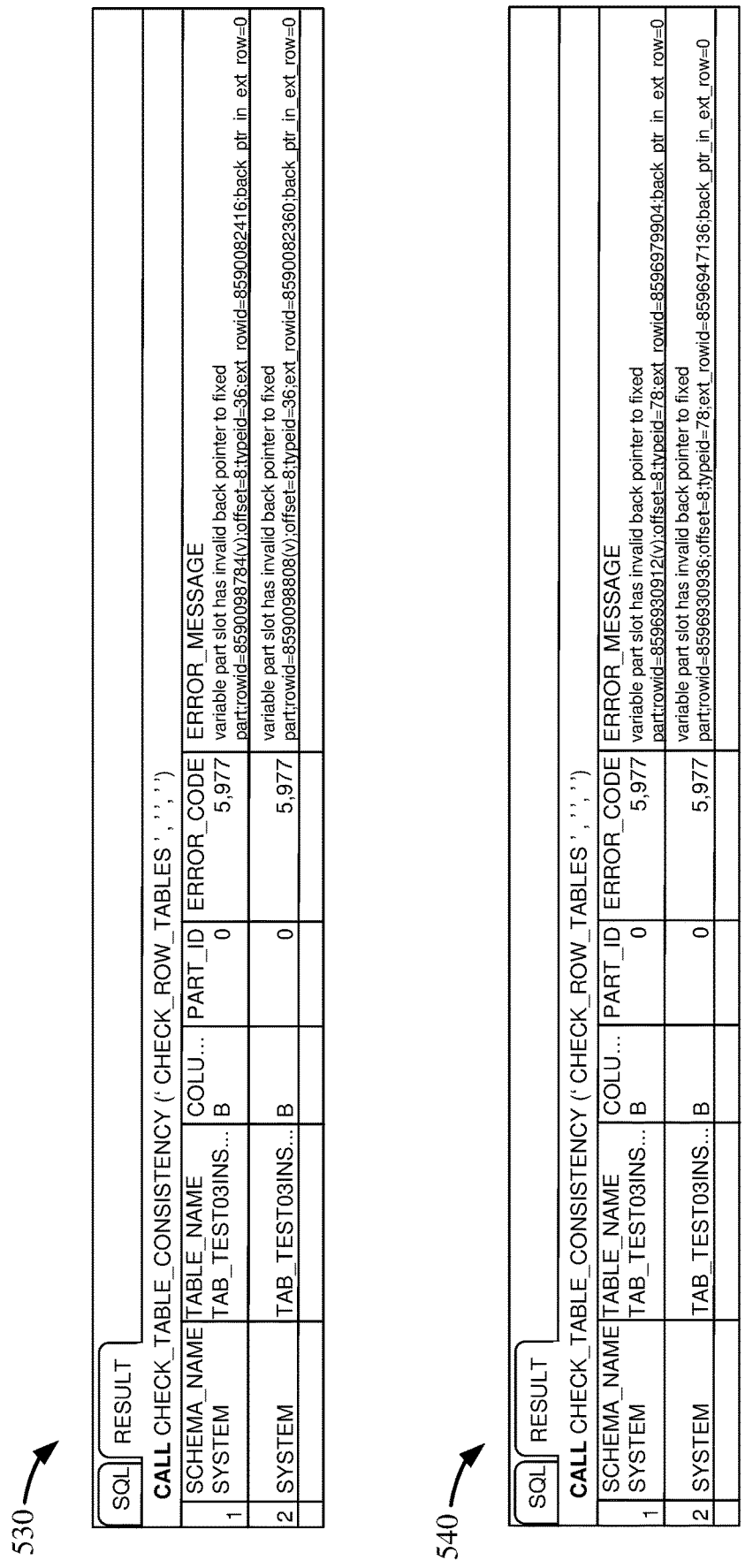
FIG. 5B depicts example results screens from testing for data storage inconsistency using auxiliary pointers.

FIG. 5B depicts example results screens from testing for data storage inconsistency using auxiliary pointers. Testing data storage consistency, such as by the processes 400, 420 shown in FIGS. 4A-B, may be accomplished by running a query (such as an SQL query), a stored procedure, or other database management system process. The testing may be initiated from a screen 530, 540 similar to as shown in FIG. 5B.

The results from the test may be displayed on the screen 530, 540. The results may indicate what table, in what schema, was tested. The results may further indicate an error code. The results may indicate an error message, similar to those show in FIG. 5A. Other identifying information or information otherwise useful for an administrator may be provided, such as a column or partition identifier. The results may vary depending on the type of irregular field in which the inconsistency was detected. For example, screen 530 may be the results from identifying an inconsistency in a variable group type. Screen 540 may be the results from identifying an inconsistency in an LOB field type.

Example 12—Correcting Inconsistent Auxiliary Pointers

An auxiliary pointer may need to be corrected after an inconsistency in the address in the auxiliary pointer is detected, such as at step 409 in process 400 or step 433 in process 420 shown in FIGS. 4A-B, or from other detection processes, such as version garbage collection or a table consistency check. Generally, correction of a pointer may be performed by an authorized user, such as a database or system administrator. Functionality may be provided for an authorized user to manually edit the auxiliary pointer, or to select the correct f-slot for the auxiliary pointer and have the system set the address. By allowing for a user to control correction of an auxiliary pointer, further review and troubleshooting can be carried out to ensure that the auxiliary pointer is truly incorrect and that no other storage slots are also using the detected v-slot.

Additionally, functionality may be provided for a user to flag an inconsistent auxiliary pointer in a v-slot version as ready for deletion (or other function), so that the detected v-slot version may be deleted during the next round of garbage collection.

A database management system may also be configured to automatically correct an inconsistent auxiliary pointer by setting it to the address of the f-slot from which the v-slot housing the auxiliary pointer was accessed during the testing process. For example, this may be executed as part of step 412 in process 400 or step 436 in process 420 as shown in FIGS. 4A-B.

Example 13—Data Storage Environment

Figure 6A:
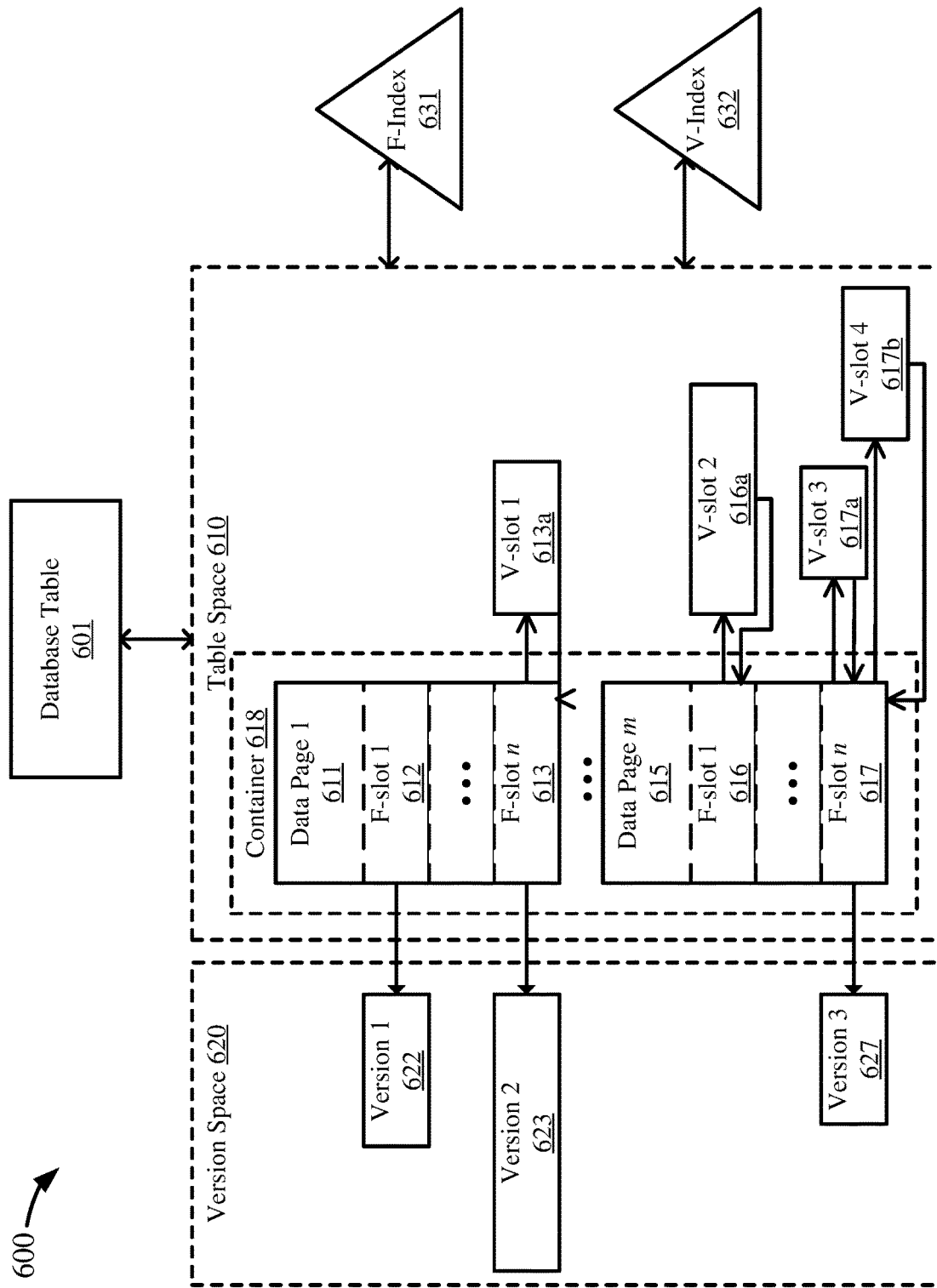
FIG. 6A is a diagram depicting a data storage environment for a database for cross-referenced data storage.

FIG. 6A is a diagram depicting a data storage environment 600 for a database having cross-referenced data storage. A database table 601 may be defined in a database management system, such as in a schema in the database management system. The database table 601 corresponds to memory allocated for storage of the records of the database table; this may be known as the table space 610.

The table space 610 for the database table 601 may have one or more data pages, such as data page 1, 611, through data page m, 615. A data page 611, 615 may be a fixed-size allocation of memory. For example, a data page 611, 615 may be set to have a size of 16 KB.

Each data page 611, 615 may be divided into a set number of fixed-size slots for data storage, which may be called an f-slot. For example, a data page of size 16 KB may be divided into 16 f-slots of 1 KB each. As another example, a data page of size 16 KB may be divided into 8 f-slots of 2 KB each. Thus, data page 1, 611, may have n number of f-slots, f-slot 1, 612, through f-slot n, 613. Data page m, 615, may then also have n number of f-slots, f-slot 1, 616, through f-slot n, 617. The data pages may be linked together as a linked list or a doubly-linked list.

A set of data pages, such as data page 1, 611, through data page m, 615, may be a container 618. A container 618 may be the allocated memory for storing fixed-size fields from a database table 601. Generally, a database table 601 will have a single container 618, which may be expanded by adding additional data pages as needed. For example, a data page m+1 may be added after data page m, 615, such as inserted at the end of a linked list (or doubly-linked list) of the data pages 611 to 615.

Further, the table space 610 may have v-slots or v-pages, or combinations thereof, for storing variable-sized fields, as described herein. A v-slot or v-page may correspond to a specific f-slot in a data page. For example, v-slot 1, 613a, may correspond to an irregular field stored in f-slot n, 613. F-slot 1, 616, of data page m, 615, may have v-slot 2, 616a. An f-slot may have multiple v-slots, for storing multiple irregular fields for example. V-slot 3, 617a, and v-slot 4, 617b, may both correspond to f-slot n, 617. The f-slots and v-slots may utilize irregular field pointers and auxiliary pointers as described herein. A v-slot is generally a subdivision of a v-page, similar to an f-slot for a data page, yet of a varying size. Thus, generally a v-slot does not have a fixed size, while a v-page may have a fixed-size, similar to a data page. The size of a v-slot may depend on the size of the data being stored in the v-slot, plus the size of the auxiliary pointer (which is generally 8 B).

The table space 610 may also have a version space 620 for storing or handling versions of records stored in the table space. An f-slot or a v-slot, or combinations thereof, may have one or more versions storing variations in the record stored in the f-slot or v-slot, as described herein and shown in FIG. 3. The versions 622, 623, 627 may have their own sets of records stored in a hierarchy, tree, or other structure similar to FIG. 3. Thus, f-slot 1, 612, may have version 1, 622, in the version space 620. F-slot n, 613, may have version 2, 623, and f-slot n, 617, may have version 3, 627. The versions 622, 623, 627 may also have their own respective containers, data pages, v-pages, and applicable f-slots and v-slots, similar to those in the table space 610.

The database table 601 may be indexed, such as by the F-Index 631 and the V-Index 632. The F-Index 631 may index the fixed-size portion of the records (e.g. fixed-size columns of the database table 601) stored in the data pages 1-m, 611, 615 in the container 618 in the table space 610. The F-Index 631 may be a B+ tree, for example. The V-Index 632 may index the variable size portion of the records (e.g. variable-size columns and composite keys of the database table 601) stored in the v-pages of the table space 610, which have v-slot 1-4, 613a, 616a, 617a, 617b. The V-Index 632 may be a CPB+ tree, for example. The auxiliary pointers in the v-slots 613a, 616a, 617a, 617b may be used, in part, for indexing in the V-Index 632 or traversing the variable records from the V-Index.

Example 14—Irregular Field Definition and Storage

Figure 6B:
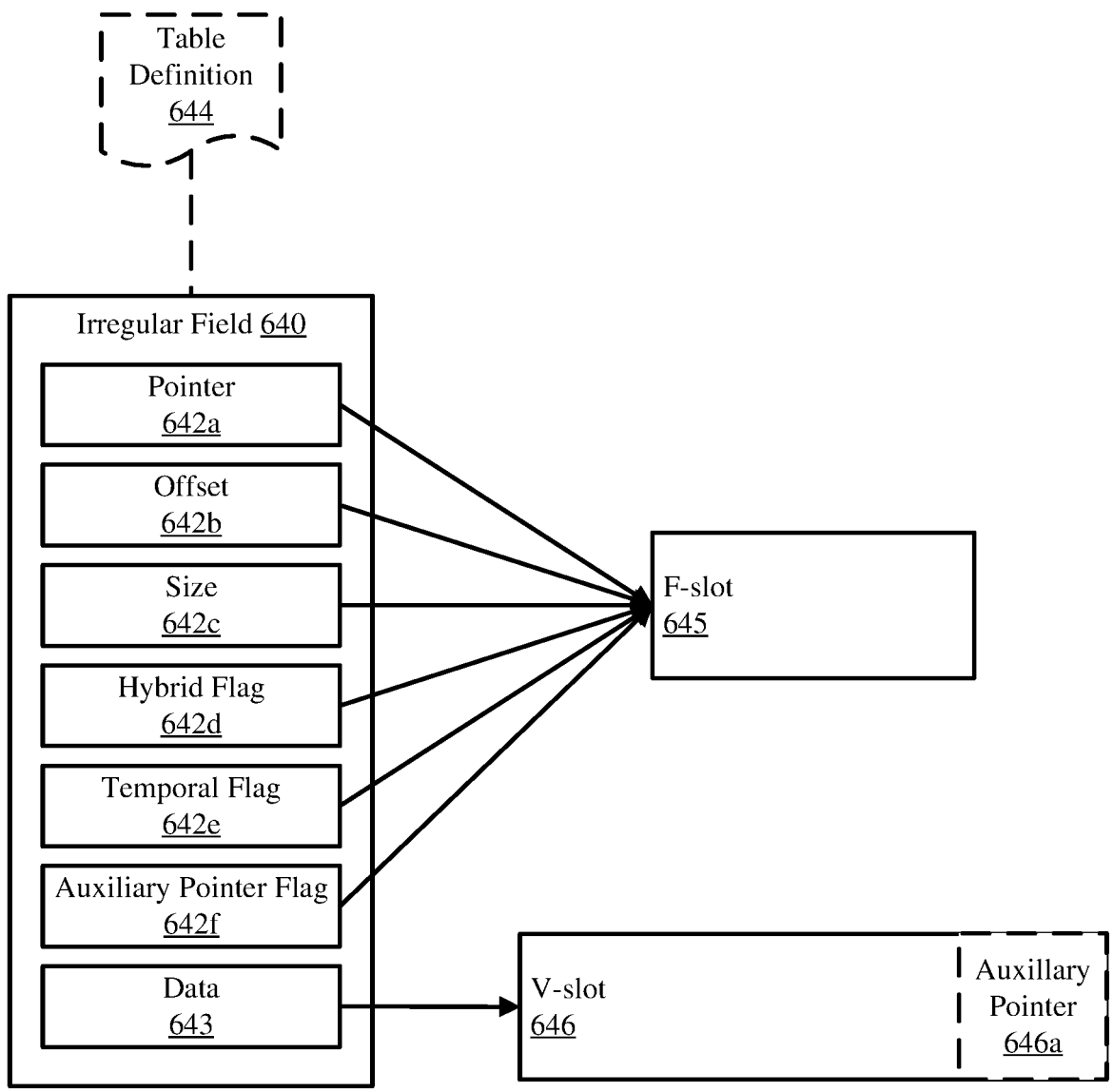
FIG. 6B depicts an example definition of an irregular field, and the irregular field components mapped to storage.

FIG. 6B depicts an example definition of an irregular field, and the irregular field components mapped to storage. An irregular field 640 may be part of a table definition 644, or otherwise defined in a database schema. Generally, in such a scenario, the irregular field 640 is a column of the table defined in the table definition 644. The irregular field 640 may have other traits in the definition, such as a name or a specific type. The irregular field 640 may be of a variable group type, such as a VARCHAR, NVARCHAR, VARBINARY, or ALPHANUM, or it may be of a large object type (LOB), such as a BLOB, CLOB, or NCLOB.

The irregular field 640 may have attributes (or properties or metadata) 642a-f, and data 643. Metadata fields may be non-deterministic for the irregular field 640. The metadata fields may include a pointer 642a, an offset 642b, a size 642c, a hybrid flag 642d, a temporal flag 642e, or an auxiliary pointer flag 642f. The irregular field 640 may have none of this metadata, all of it, or some combination thereof, or other metadata. Generally, the metadata fields identify aspects of the irregular field 640 or provide information on storage of the irregular field. The metadata fields are generally of a fixed size.

The pointer field 642a may contain the address of the v-slot used for the irregular field 640, as described herein. The pointer field 642a may be set to a fixed size large enough to store a memory location address (either physical or logical), such as 8 B.

The offset field 642b may contain the location offset of the start of the data 643 as stored in the v-slot used for the irregular field 640, as described herein. The offset field 642b may be set to a fixed size large enough to store a memory offset count, such as 8 B.

The size field 642c may contain the size of the data 643 of the irregular field 640. The size 642c may be used to determine the amount of memory the v-slot uses, or the amount of memory the irregular field data 643 uses in the v-slot, as described herein. Thus, the size field 642c may be used similarly to the offset field 642c. The size field 642c may be 8 B.

The hybrid flag field 642d may be a flag or other indicator used to indicate a hybrid irregular field 640; this may be of particular use in LOB type irregular fields. The hybrid flag field 642d may be 2 B.

The temporal flag field 642e may be a flag or other indicator used to indicate a time or time-based (or time-sensitive) field; this may be of particular use in LOB type irregular fields. The temporal flag field 642e may be 1 B.

The auxiliary pointer flag field 642f may be a flag or other indicator used to indicate that the irregular field has, or at least is expected to have, an auxiliary pointer in the corresponding v-slot. The auxiliary pointer flag field 642f may be used to determine if a consistency check process testing the auxiliary pointer may be run, such as process 400 or process 420 shown in FIGS. 4A-B. In some embodiments, an auxiliary pointer may always be used, and so the auxiliary pointer flag 642f may not be needed or included as part of the irregular field 640.

In other embodiments, an auxiliary pointer may be used at some times, but not others, making the auxiliary pointer flag 642f useful for determining the scope of data storage consistency testing, or other database management processes using the auxiliary pointer. For example, a database management system may be upgraded to include use of an auxiliary pointer as described herein. However, records stored before the upgrade (already existing records), may not have auxiliary pointers. In such cases, an auxiliary pointer flag 642f may be useful to identify the newer records that have the auxiliary pointers and may thus make use of the upgraded functionality.

As described herein, the storage of the irregular field 640 may be split between an f-slot 645 and a v-slot 646. The metadata fields 642a-f are generally stored as part of the irregular field 640 in the f-slot 645. Storing fixed-size fields, such as the metadata fields 642a-f, in a fixed-size data storage slot, such as f-slot 645, may increase data storage efficiency and data access efficiency.

The data 643 of the irregular field 640 is generally of a variable size and may accordingly be stored in a variable-size storage location, such as v-slot 646. In this way, records for the table, as defined in the table definition 644, that include an irregular field 640 having a variable-size may be efficiently stored by a mix between a fixed-size storage location and a variable-size storage location. The v-slot 646 may have an auxiliary pointer 646a, as described herein. The auxiliary pointer 646a may store the address of the corresponding f-slot, such as f-slot 645, and may be sized to store a memory location address. Generally, the auxiliary pointer 646a is of a fixed-size, such as 8 B.

In some scenarios, the size of the data 643 may be less than or equal to the size of the metadata fields 642a-f. In such cases, the data 643 may be stored in the f-slot 645 rather than a v-slot 646. In this way, the fixed-size attributed to the irregular field 640 for the f-slot 645 may act as a threshold (e.g. the total size of the metadata fields 642a-f for the irregular field) for determining where to store the data 643. Such an embodiment may increase efficiency and reduce usage of storage space.

Example 15—Stored Records Example with Auxiliary Pointer

Figure 6C:
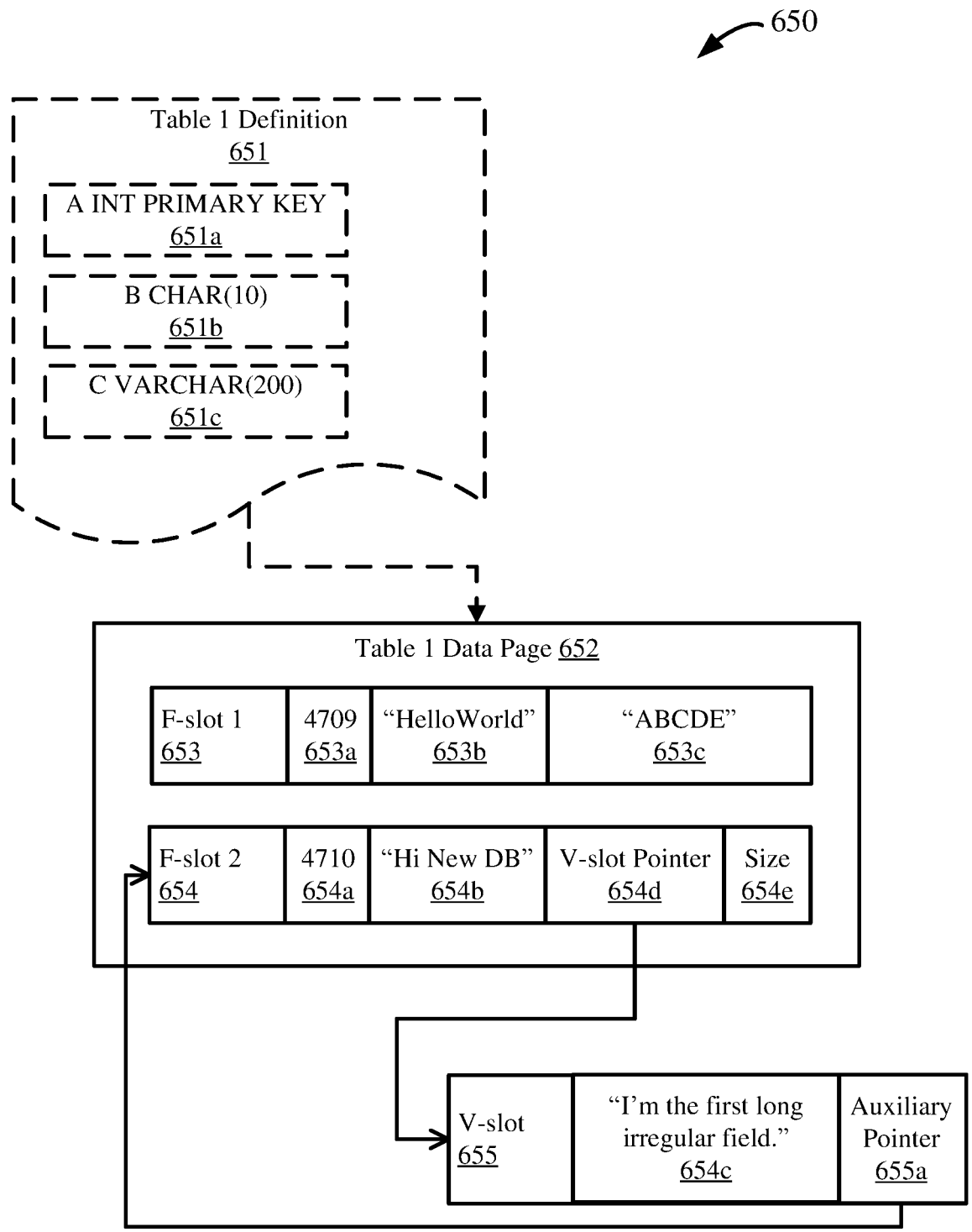
FIG. 6C illustrates an example 650 of records stored using an auxiliary pointer.

FIG. 6C illustrates an example 650 of records stored using an auxiliary pointer as described herein. A table 1 definition 651 may define a table in a database system, such as in a database schema in the database system. The table 1 definition 651 may include several fields defining the columns for the table 1. For example, the definition 651 may include a field A 651a of type INT as a primary key, a field B 651b of type CHAR with a length of 10, or a field C 651c of type VARCHAR of length 200. Field C 651c is an irregular field as it is of type VARCHAR.

Table 1 may be instantiated from the definition 651 with memory allocated to storing records for the table, such as Table 1 Data Page 652. The Table 1 Data Page 652 may be actual memory of a specific amount, such as 64 KB, having a physical memory address, and, in some embodiments, a logical memory address as well. The Table 1 Data Page 652 may have several specific memory slots, generally of a fixed number, such as F-slot 1 653 and F-slot 2 654. The f-slots 653, 654 may be of a specific size and thus have that much physical memory allocated to them, having a physical memory address and, in some embodiment, a logical memory address. A memory slot may be a memory location of a given size having a physical memory address, which may be mapped to one or more logical memory addresses. A memory slot may be an f-slot, a v-slot, a v-page or other unit of memory. A memory slot may be in volatile or non-volatile (long-term) memory or storage.

One or more v-slots may be allocated to store data from Table 1 651 as well, such as V-slot 655. The v-slots may be of a fixed size or variable size, depending on the embodiment. The v-slots will also have physical memory allocated to them, having physical memory addresses and, in some embodiments, logical memory addresses as well. V-slots may only be allocated as a record requiring a v-slot is stored into the table.

A record for Table 1 may consist of the integer value 4709 for field A, 651a, the string "HelloWorld" for field B, 651b, and the string "ABCDE" for field C, 651c. This record may be stored in F-slot 1, 653, in the memory locations 653a for 4709, 653b for "HelloWorld," and 653c for "ABCDE." Although "ABCDE" is of type VARCHAR and so may require a v-slot, the size of the value "ABCDE" is no larger than the space give for field C, 651c, in an f-slot, thus it can be stored directly in F-slot 1, 653.

A second record for Table 1 may consist of the integer value 4710 for field A, 651a, the string "Hi New DB" for field B, 651b, and the string "I'm the first long irregular field." for field C, 651*c*. This record may be stored in F-slot 2, 654, in the memory locations 654*a* for 4710, 654*b* for "Hi New DB." The memory location 653*c* for field C may not store the VARCHAR string "I'm the first long irregular field." because it is longer than the space allocated for the fixed-size fields in the f-slot. Thus, the memory location 653*c* for field C may instead store a v-slot pointer 654*d* and a field size 654*e* (or an offset, in some cases). The v-slot pointer 654*d* may store the address of the v-slot 655, either a physical memory address or a logical address. The size 654*e* may be the size of the string "I'm the first long irregular field." The string "I'm the first long irregular field." may be stored in the v-slot 655 at location 654*c*. After the string, the auxiliary pointer 655*a* may be stored, and may contain the memory address (either physical or logical) of the F-slot 2, 654.

The table 1 definition 651 may have an additional field of an irregular type, such as a field D of type NVARCHAR. In such a scenario, this fourth field D may also be stored in the f-slots for the table, such as F-slot 1 653 and F-slot 2 654. In some embodiments, the fourth field D may be stored at the end of the memory segment after the field C. This may include storing a separate v-slot pointer and a separate size for the field D. In some cases the v-slot pointer may point to the same v-slot as field C. In other cases, the fields C and D in a record may point to different v-slots.

In some embodiments with a fourth field D, the storage of field D in the f-slot may not include a separate v-slot pointer, but may only include a size or offset. In such cases, the same v-slot may be used for all irregular fields in that record. Other metadata fields may be treated similarly, based on their applicability to other irregular fields defined in the table definition for a record.

Example 16—Additional Auxiliary Pointer Processes

Figure 7A:
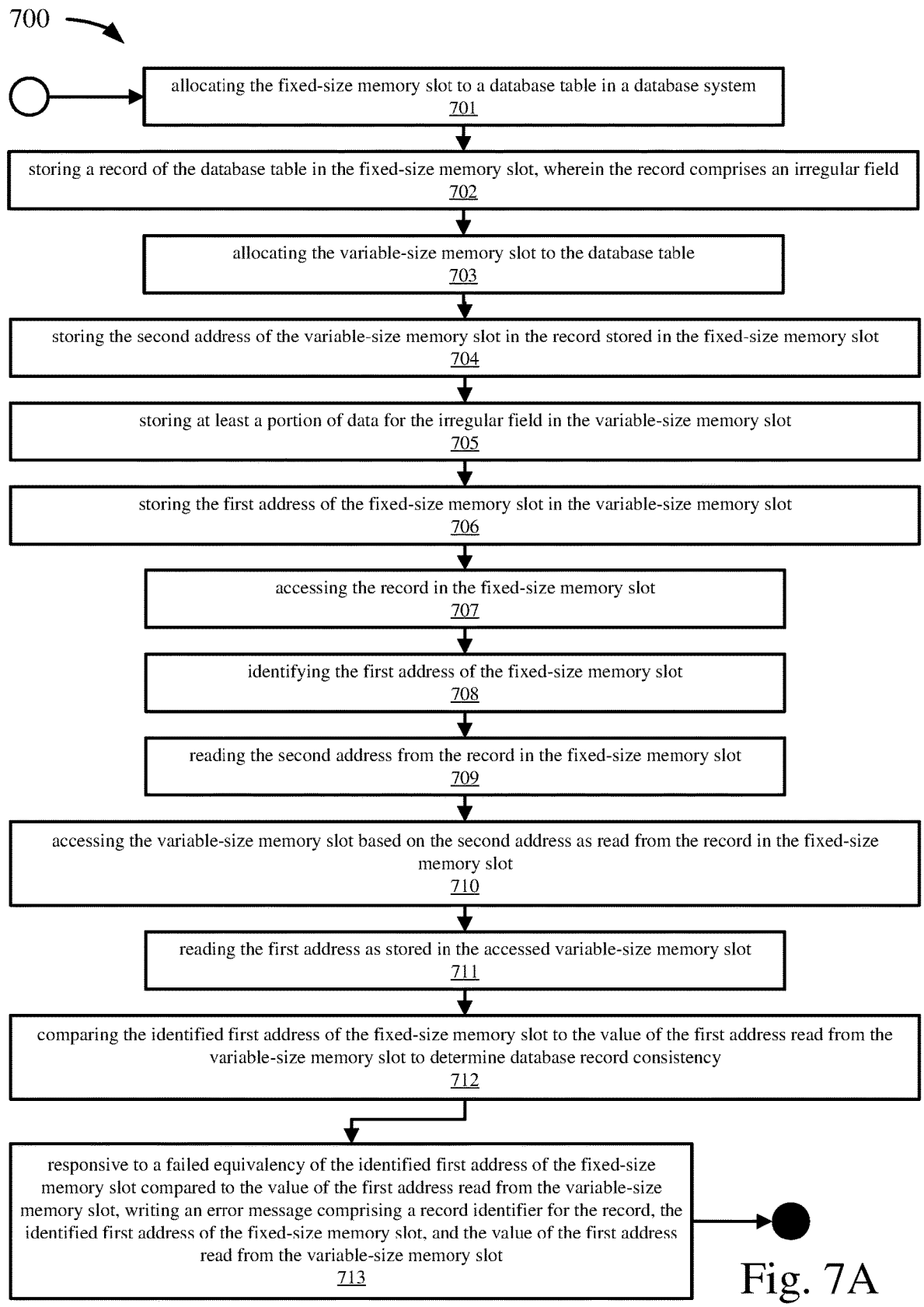
FIG. 7A is a flowchart illustrating a process for generating and testing a structure for improving database consistency.

FIG. 7A illustrates a process 700 for generating and testing a structure for improving database consistency. A fixed-size memory slot having a first address may be allocated to a database table in a database system at 701. A record of the database table may be stored in the fixed-size memory slot at 702, where the record has an irregular field. A variable-size memory slot having a second address may be allocated to the database table at 703.

The address of the variable-size memory slot may be stored at 704 in the record stored in the fixed-size memory slot. At least a portion of data for the irregular field may be stored in the variable-size memory slot at 705. The address of the fixed-size memory slot may be stored in the variable-size memory slot at 706.

The record in the fixed-size memory slot may be accessed at 707. The first address of the fixed-size memory slot may be identified at 708. The address of the variable-size memory slot may be read at 709 from the record in the fixed-size memory slot. The variable-size memory slot may be accessed at 710 based on the address as read from the record in the fixed-size memory slot. The fixed-size memory slot address may be read as stored in the accessed variable-size memory slot at 711.

The identified address of the fixed-size memory slot may be compared to the value of the fixed-size memory slot address read from the variable-size memory slot to determine database record consistency at 712. Responsive to a failed equivalency of the identified address of the fixed-size memory slot compared to the value of the fixed-size memory slot address read from the variable-size memory slot, an error message may be written at 713, where the error message includes a record identifier for the record, the identified address of the fixed-size memory slot, and the value of the fixed-size memory slot address read from the variable-size memory slot.

Figure 7B:
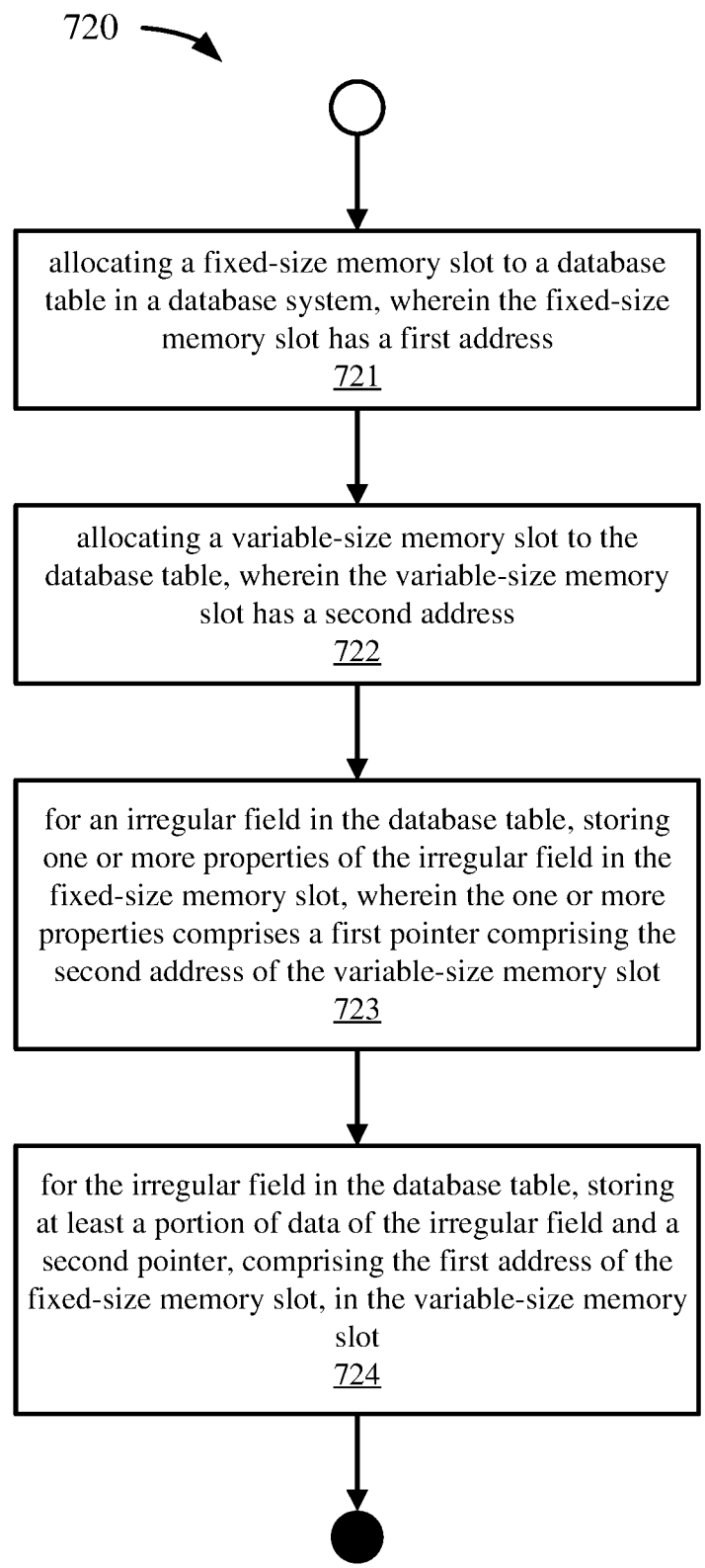
FIG. 7B is a flowchart illustrating a process for generating a structure for maintaining and testing database consistency.

FIG. 7B illustrates an additional process 720 for generating a structure for maintaining and testing database consistency. A fixed-size memory slot may be allocated to a database table in a database system at 721, where the fixed-size memory slot has an address. A variable-size memory slot may be allocated to the database table at 722, where the variable-size memory slot has a different address.

For an irregular field in the database table, one or more properties of the irregular field may be stored in the fixed-size memory slot at 723. The one or more properties may include a first pointer which may have the address of the variable-size memory slot. For the irregular field in the database table, at least a portion of data of the irregular field and a second pointer, which may have the address of the fixed-size memory slot, may be stored in the variable-size memory slot at 724.

Figure 7C:
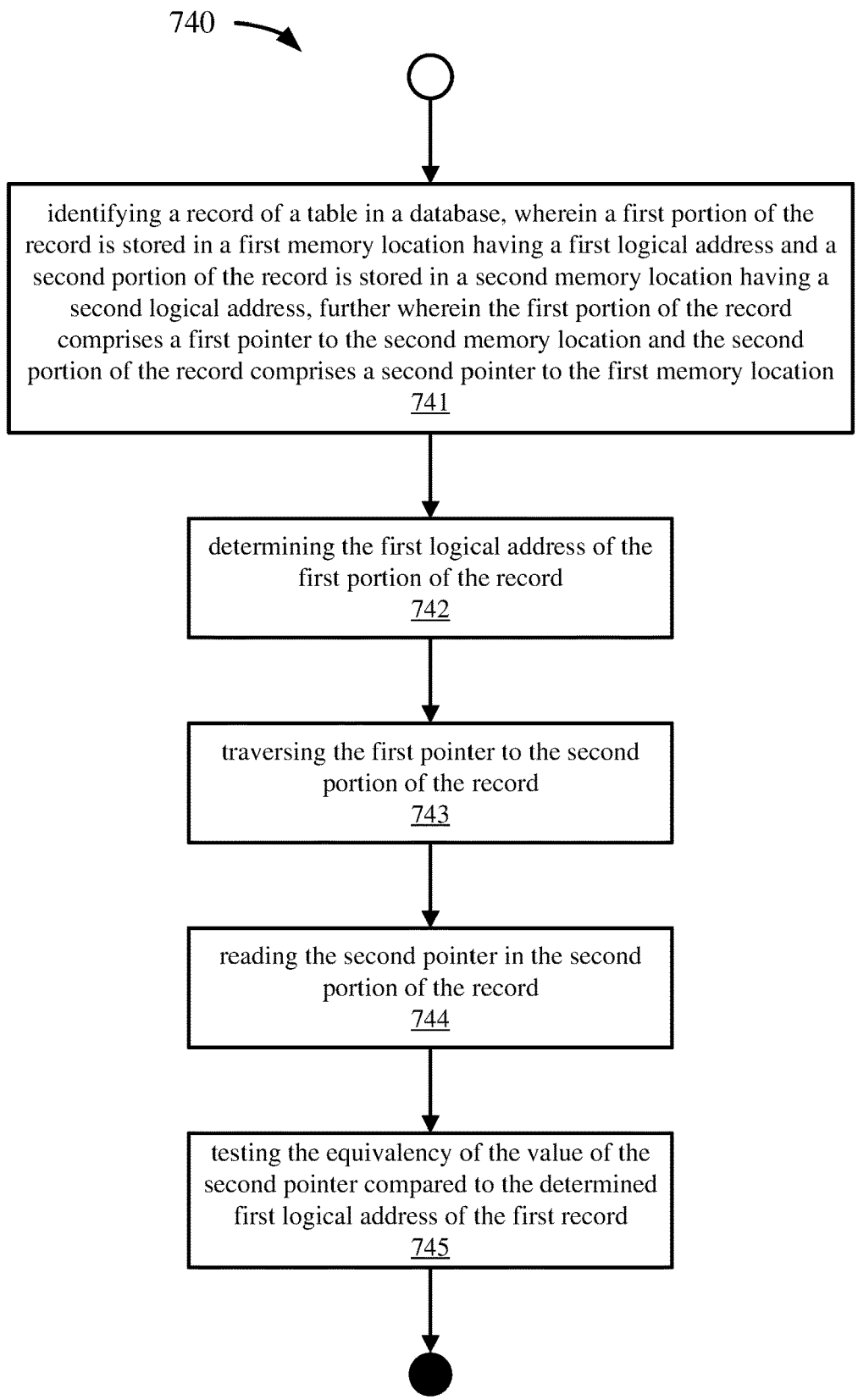
FIG. 7C is a flowchart illustrating a process for testing the consistency of a cross-referenced database.

FIG. 7C illustrates a further process 740 for testing the consistency of a database. A record of a table in a database is identified at 741. A first portion of the record may be stored in a first memory location having a first logical address and a second portion of the record may be stored in a second memory location having a second logical address. Further, the first portion of the record may include a first pointer to the second memory location and the second portion of the record may include a second pointer to the first memory location.

The first logical address of the first portion of the record is determined at 742. The first pointer is traversed to the second portion of the record at 743. The second pointer in the second portion of the record is read at 744. Testing the equivalency of the value as read of the second pointer compared to the determined first logical address of the first record is accomplished at 745.

Example 17—Computing Systems

Figure 8:
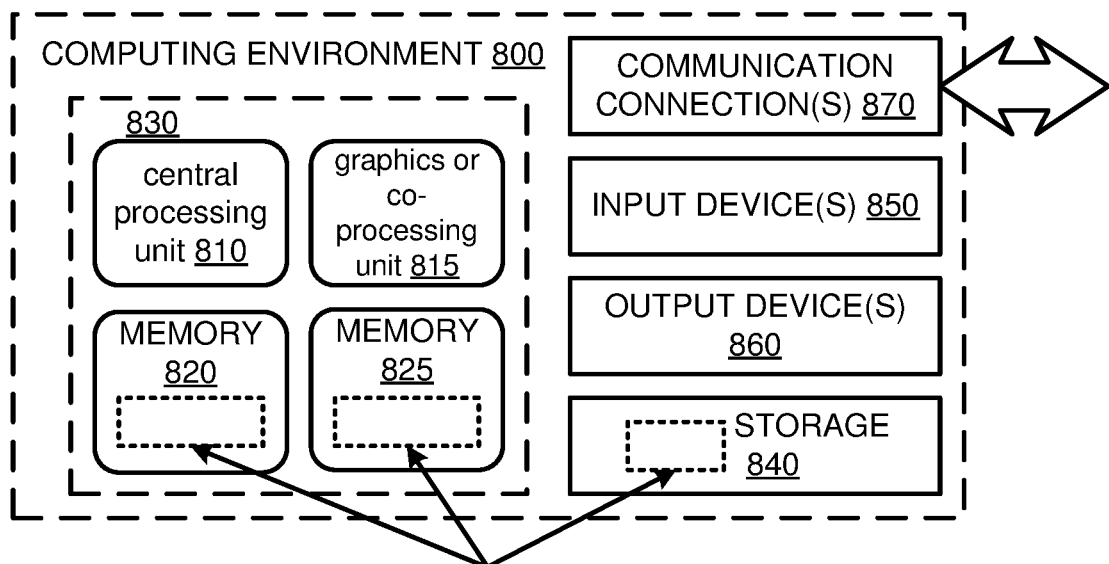
FIG. 8 is a diagram of an example computing system in which described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of FIGS. 4A-B or 7A-C, or the systems of FIG. 1A-B, 2A-C, 3, 5A-B, or 6A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store settings or settings characteristics, such as for the memory structures shown in FIG. 1A-B, 2A-C, 3, or 6A-C.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Cloud Computing Environment

Figure 9:
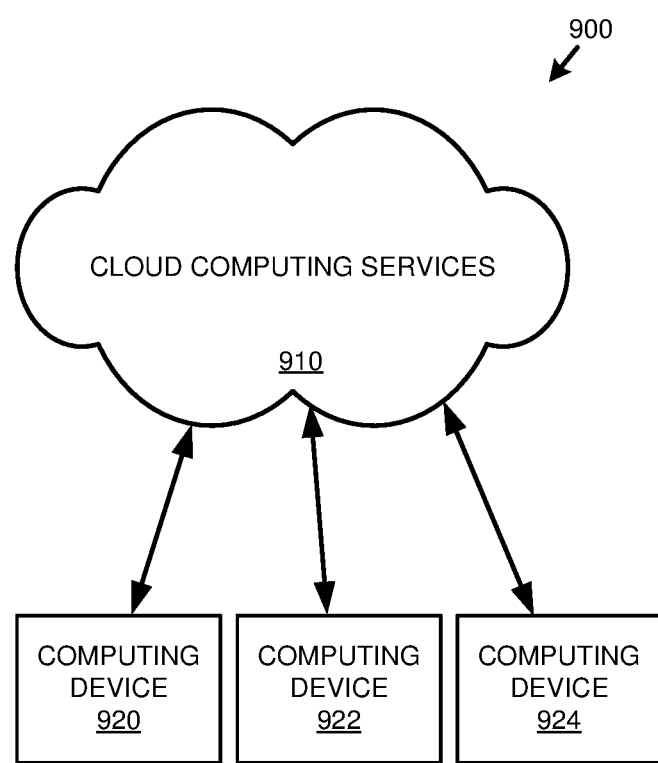
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 19—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system for testing database consistency, the system comprising:
one or more memories, wherein the one or more memories include:
a fixed-size memory slot having a first address, and
a variable-size memory slot having a second address;
one or more processing units coupled to the one or more memories; and
one or more computer readable storage media storing instructions that, when loaded into the one or more memories, cause the one or more processing units to perform operations for:
allocating the fixed-size memory slot to a database table in a database system;
storing a record of the database table in the fixed-size memory slot, wherein the record comprises an irregular field;
allocating the variable-size memory slot to the database table;
storing the second address of the variable-size memory slot in the record stored in the fixed-size memory slot;
storing at least a portion of data for the irregular field in the variable-size memory slot;
storing the first address of the fixed-size memory slot in the variable-size memory slot;
accessing the record in the fixed-size memory slot;
identifying the first address of the fixed-size memory slot;
reading the second address from the record in the fixed-size memory slot;
accessing the variable-size memory slot based on the second address as read from the record in the fixed-size memory slot;
reading the first address as stored in the accessed variable-size memory slot;
comparing the identified first address of the fixed-size memory slot to the value of the first address read from the variable-size memory slot to determine database record consistency; and
responsive to a failed equivalency of the identified first address of the fixed-size memory slot compared to the value of the first address read from the variable-size memory slot, writing an error message comprising a record identifier for the record, the identified first address of the fixed-size memory slot, and the value of the first address read from the variable-size memory slot.

2. The system of claim 1, wherein the first address and the second address are logical memory addresses mapped to physical memory addresses in the one or more memories.

3. The system of claim 1, wherein the accessing is initiated by a user for testing the consistency of the database table in the database system.

4. The system of claim 3, wherein the error message is provided to the user.

5. The system of claim 1, wherein the accessing is initiated automatically by the database system.

6. The system of claim 5, wherein the database system automatically initiates the accessing as part of a garbage collection process.

7. One or more non-transitory computer-readable storage media storing computer-executable instructions for causing a computing system to perform a method for improving database consistency, the method comprising:
allocating a fixed-size memory slot to a database table in a database system, wherein the fixed-size memory slot has a first address;

allocating a variable-size memory slot to the database table, wherein the variable-size memory slot has a second address;

for an irregular field in the database table, storing one or more properties of the irregular field in the fixed-size memory slot, wherein the one or more properties comprises a first pointer comprising the second address of the variable-size memory slot; and, for the irregular field in the database table, storing at least a portion of data of the irregular field and a second pointer, comprising the first address of the fixed-size memory slot, in the variable-size memory slot.

8. The one or more non-transitory computer-readable storage media of claim 7, wherein the first address and the second address are logical memory addresses.

9. The one or more non-transitory computer-readable storage media of claim 7, the method further comprising:

checking consistency between the fixed-size memory slot and the variable-size memory slot, wherein the checking comprises:

accessing the fixed-size memory slot;
reading the first address of the fixed-size memory slot;
traversing the first pointer to the variable-size memory slot;
reading the second pointer of the variable-size memory slot; and
testing the equivalency of the first address to the value of the second pointer.

10. The one or more non-transitory computer-readable storage media of claim 9, the method further comprising:
writing results of the checking to a log file.

11. The one or more non-transitory computer-readable storage media of claim 9, wherein the checking is initiated by a database user.

12. The one or more non-transitory computer-readable storage media of claim 11, the method further comprising:
providing results of the checking to the user.

13. The one or more non-transitory computer-readable storage media of claim 9, wherein the checking is initiated automatically by the database system.

14. The one or more non-transitory computer-readable storage media of claim 13, wherein the database system automatically initiates the checking as part of a garbage collection process.

15. A method for testing database consistency, the method comprising:

identifying a record of a table in a database, wherein a first portion of the record is stored in a first memory location having a first logical address and a second portion of the record is stored in a second memory location having a second logical address, further wherein the first portion of the record comprises a first pointer to the second memory location and the second portion of the record comprises a second pointer to the first memory location;

determining the first logical address of the first portion of the record;

traversing the first pointer to the second portion of the record;

reading the second pointer in the second portion of the record;

testing the equivalency of the value of the second pointer compared to the determined first logical address of the first record.

16. The method of claim 15, further comprising:
outputting the results of the equivalency test to an error trace.

17. The method of claim 15, wherein the method is initiated by a database user.

18. The method of claim 17, further comprising:
providing the results of the equivalency test in an error report to the database user.

19. The method of claim 15, wherein the method is initiated automatically by a database system housing the database.

20. The method of claim 19, wherein the database system automatically initiates the method as part of a garbage collection process.

* * * * *